United States Patent [19]

Matsui et al.

[11] Patent Number: 4,803,508

[45] Date of Patent: Feb. 7, 1989

[54] FOCUS DETECTION SYSTEM AND LIGHTING DEVICE THEREFOR

[75] Inventors: Tohru Matsui, Sakai; Takeshi Egawa, Osaka, both of Japan

[73] Assignee: Minolta Camera Kabushiki Kaisha, Osaka, Japan

[21] Appl. No.: 85,088

[22] Filed: Aug. 13, 1987

Related U.S. Application Data

[60] Division of Ser. No. 940,190, Dec. 9, 1986, Pat. No. 4,690,538, which is a continuation of Ser. No. 807,642, Dec. 11, 1985, abandoned.

[30] Foreign Application Priority Data

Dec. 11, 1984 [JP] Japan ................. 59-261194
Jan. 17, 1985 [JP] Japan ................... 60-7178
Jan. 19, 1985 [JP] Japan ................... 60-7686
Jan. 21, 1985 [JP] Japan ................... 60-9716

[51] Int. Cl.$^4$ .............................................. G03B 3/00
[52] U.S. Cl. .................................................. 354/403
[58] Field of Search ............. 354/403, 413, 415, 195.1, 354/149.1, 126, 165, 62; 356/1, 4; 250/201, 201 AF, 552, 553, 503.1, 504 R, 237 G; 362/259, 800, 351

[56] References Cited

U.S. PATENT DOCUMENTS

| | | | |
|---|---|---|---|
| 3,653,762 | 4/1972 | Harvey | 354/403 |
| 3,676,668 | 7/1972 | Collins et al. | 307/311 |
| 4,002,899 | 1/1977 | Stauffer | 250/201 |
| 4,065,778 | 12/1977 | Harvey | 354/403 |
| 4,150,888 | 4/1979 | Filipovich | 354/25 |
| 4,185,191 | 1/1980 | Stauffer | 250/204 |
| 4,255,029 | 3/1981 | Freudenschuss | 354/25 |
| 4,313,654 | 2/1982 | Matsui et al. | 354/25 |
| 4,341,953 | 7/1982 | Sakai et al. | 250/204 |
| 4,371,261 | 2/1983 | Tsuji | 354/403 X |
| 4,394,077 | 7/1983 | Yoshino et al. | 354/25 |
| 4,575,211 | 3/1986 | Matsumura et al. | 354/403 |
| 4,690,538 | 9/1987 | Matsui et al. | 354/403 |

FOREIGN PATENT DOCUMENTS

| | | |
|---|---|---|
| 52-95221 | 8/1977 | Japan . |
| 55-55805 | 4/1980 | Japan . |
| 59-126517 | 7/1984 | Japan . |

*Primary Examiner*—W. B. Perkey
*Attorney, Agent, or Firm*—Burns, Doane, Swecker & Mathis

[57] ABSTRACT

A lighting device such as an electronic flash device attachable to a camera body includes first and second light projecting optical systems which project first and second light fluxes for illuminating an object to aid focus detection by a focus detection device. The second light flux spreads at a larger solid angle than the first light flux and illuminates a first distance zone which extends to a closer distance side while covering the whole of a second distance zone illuminated by the first light flux. An optical wedge disposed in the second light projecting optical system deflects a part of the second light flux towards the closer distance side of the first distance zone. Another lighting device includes a single light projecting optical system but it also includes an optical wedge for deflecting a part of a light flux projected by the light projecting optical system to widen a distance zone illuminated by the light flux towards a closer distance. The optical wedge also serves to produce a difference in intensity distribution of the light flux such that the light flux has higher intensity at a part thereof for illuminating a farther distance side of the distance zone than at a part thereof for illuminating a closer distance side of the distance zone. A light source of the light projecting optical system(s) is provided with a conical light reflecter surrounding a light emitting diode to reflect light emitted from side surfaces of the light emitting diode forward.

4 Claims, 47 Drawing Sheets

FOCUS DETECTION SYSTEM AND LIGHTING DEVICE THEREFOR

This application is a divisional of application Ser. No. 940,190 filed Dec. 9, 1986 now U.S. Pat. No. 4,690,538, which is a continuation of Ser. No. 807,642, filed Dec. 11, 1985 abandoned.

BACKGROUND OF THE INVENTION

1. Field of the Invention

The present invention relates to a T.T.L. (through the lens) focus detection system utilizing an auxiliary light to help focus detection and a lighting device for projecting such an auxiliary light.

2. Description of the Prior Art

There have been proposed a variety of T.T.L. focus detection systems which detect focusing condition of an objective lens based on the light which has passed through the objective lens. The typical systems are the phase difference detection system disclosed in Japanese Patent Laid Open Publication Nos. 52-95221 and 54-159259 or contrast detection system disclosed in Japanese Patent Laid Open Publication No. 55-155308. In general, a T.T.L. focus detection system has such a disadvantage that it can hardly or cannot carry out focus detection when the object is dark or the contrast of the object is low. In such a case, a lighting device which projects an auxiliary light toward the object is used in order to help the focus detection. For example, such examples are disclosed in the specifications of U.S. Pat. No. 4,150,888 and in Japanese Patent Laid Open Publication No. 57-73709.

However, various problems are left unsolved in putting into practical use such focus detection system utilizing an auxiliary light emitted from a lighting device as described above. One of the most serious problems among them is how to effectively light the object scene within the range from the near to far distance. Particularly, a lens exchangeable camera like a single-lens reflex camera which allows interchange of a variety of lenses is required to have a high focus detection accuracy and also to be capable of carrying out focus detection with respect to an object within a wider range of near to far distance with a variety of lenses from super wide-angle to super telephoto lenses in use.

Therefore, a lighting device used for such a lens exchangeable camera is also requried to be capable of lighting wider distance range from the near to far distance while covering the focus detection area spreading at a solid angle dependent on the angle of the field of a lens attached to the camera. In case the lighting distance is to be increased, it is possible to raise the light condensing capability of a light projecting optical system to make the spread of the projected light small. However, in this case, the lighting range is narrowed and it is no longer possible to light the objects within a range from the near to far distances at the same time unless the light is projected from the camera along the optical axis through the objective lens. On the contrary, if the light condensing capability of the light projecting optical system is lowered and the spread of the projected light is widened, the lighting range can be widened but lighting distance is shortened. Moreover, if a power of light source of the light projecting optical system is increased, the lighting range can be widened and the lighting distance, can also be elongated. However, this is not undesirable in general because a light source having a large capacity is required and power consumption becomes large.

The lighting device disclosed in the specification of U.S. Pat. No. 4,150,888 is provided with a light projecting optical system which is pivoted in conjunction with focusing movement of an objective lens so that the angle of the light projection axis relative to the optical axis of the objective lens changes. With such a construction, objects within a range of near to far distance can be lighted in accordance with the focusing movement of the objective lens and the lighting distance can be extended by raising the condensing capability of the light projecting optical system. However, the lighting range is narrowed and, if the objective lens is largely deviated from a proper focus position with respect to a main object, the main object cannot be lighted by the light, resulting in failure of focus detection. In addition, pivoted as the light projecting optical system should be as described above, a mechanical interlocking system which interlocks the light projecting optical system with the focusing movement of the objective lens is essential. Therefore, the lighting device is complicated in construction. Moreover it is difficult to provide a lens interchangeable camera with such an interlocking mechanism.

On the other hand, in the case of the lighting device disclosed in Japanese Patent Laid Open Publication No. 57-73709, a light projecting optical system is provided on the lens barrel of an exchangeable lens and this optical system is pivoted in conjunction with the focusing movement of the objective lens of the exchangeable lens. Such a lighting device is free from the disadvantage of difficulty in application to a lens exchangeable camera but still suffers from the other disadvantages of the lighting device disclosed in the specification of U.S. Pat. No. 4,150,888.

Moreover, such a lighting device suffers from another disadvantage that each exchangeable lens becomes very expensive since the light projecting optical system must be provided on the lens barrel of each excahngeable lens.

SUMMARY OF THE INVENTION

It is accordingly an object of the present invention to provide a T.T.L. focus detection system for a camera utilizing an improved lighting device which can eliminate the above described disadvantages of the prior arts.

Another object of the present invention is to provide a lighting device constituted as an accessory attachable to the camera and adapted to illuminate a wider distance range within a focus detection area with a high lighting efficiency.

A focus detection system of the present invention may have two forms, one of which includes first and second light projecting optical systems and the other of which includes a single light projecting optical system. In the case of the focus detection system of the present invention including the first and second light projecting optical systems, the first light projecting optical system projects a first flux of light which illuminates a first distance zone within a focus detection area and the second light projecting optical system projects a second flux of light which illuminates a second distance zone within the focus detection area. Here, the focus detection area spreads at a predetermined solid angle centering at the optical axis of an objective lens of the camera and depending upon the objective lens. The second distance zone is set wider than the first distance zone so as to cover the whole of the first distance zone at a farther distance side thereof and so as to extend beyond the first distance zone at a closer distance side thereof. Accordingly, the farther distance side of the second distance zone within the focus detection area is illuminated or lighted by the first and second fluxes of light projected by the first and second light projecting optical systems and the closer distance side of the second distance zone within the focus detection area is illuminated or lighted by the flux of light projected by the second light projecting optical system. Namely, the lights illuminating the farther distance side are intensified by the overlap of the first and second fluxes of light to raise a lighting efficiency, and therefore it is made possible to widen the distance range for focus detection i.e., the second distance zone which is as a whole illuminated or lighted by the second flux of light projected by the second light projecting optical system. The closer distance side is illuminated or lighted only by the second flux of light but this does not matter because of the shorter distance. Due to the increased lighting efficiency it becomes unnecessary to provide an interlocking mechanism interlocking any of the first and second light projecting optical systems with focusing movement of the objective lens and therefore the system of the present invention is suited for a lens exchangeable type camera.

In the case of the focus detection system of the present invention including the single light projecting optical system, the light projecting optical system projects a flux of light which crosses the focus detection area at a predetermined angle and means is provided to produce a difference in intensity distribution of the flux of light so that the flux of light has a higher intensity at a part thereof for illuminating a farther distance zone within the focus detection area than at a part thereof for illuminating a closer distance zone within the focus detection area. Such difference in intensity distribution of the flux of light may be produced by deflecting a part of the flux of light towards the closer distance zone. It is also made possible by this arrangement to widen the distance range for focus detection without use of a interlocking mechanism interlocking the light projection optical system with focusing movement of the objective lens.

According to the present invention, the first and second light projecting optical systems can be incorporated in a lighting device which is attachable to the camera. Similarly, a lighting device attachable to the camera may incorporate the single light projecting optical system and the difference producing means. Such a lighting device may be an electronic flash device which emits flash light for flash photography in addition to the first and second fluxes of light or the flux of light for focus detection.

The novel features which are believed to be characteristic of the invention, both as to organization and method of operation, together with further objects and advantages thereof, will be better understood from the accompanying drawings in which several preferred embodiments of the invention are illustrated by way of example. It is to be understood, however, that the drawings are for the purpose of illustration and description only and are not intended as a definition of the limits of the invention.

DETAILED DESCRIPTION OF THE PREFERRED EMBODIMENTS

Figure 1:
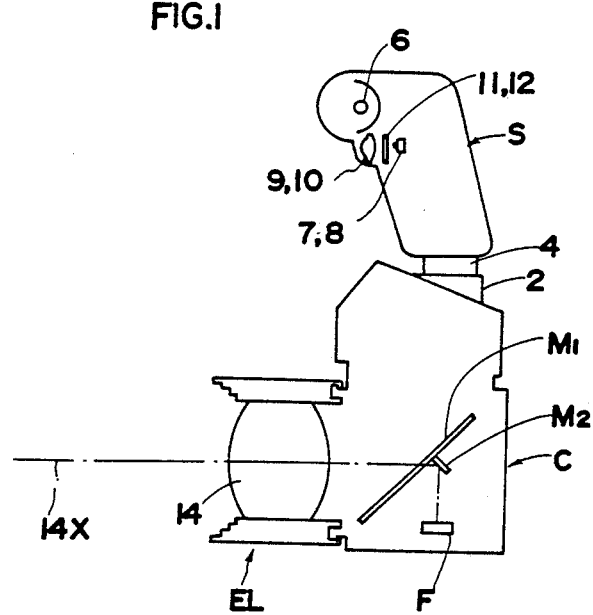
FIG. 1 shows outline of a focus detection system utilizing a lighting device according to a first embodiment of the present invention.

A first embodiment of the present invention is described at first with respect to FIGS. 1 to 6. The lighting device of the first embodiment has two light projecting optical systems and is applied to an electronic flash device for taking a picture with flash. In FIG. 1, C represents a lens exchangeable type camera constituted as a single-lens reflex camera having a main mirror Mi; EL and S represent respectively an exchangeable lens and a lighting device attached to the camera. The lighting device S is mounted at the leg 4 on an accessory shoe 2 provided at the upper surface of the camera C and provided with a known flash tube 6 for producing flash light and first and second light projecting systems including light source devices 7 and 8 described later and a pair of projection lenses 9 and 10 etc. The lighting device S is also provided with a known circuit for flashing the flash tube 6, constituted by a voltage boosting circuit, a main capacitor and a trigger circuit, etc. and a circuit for energizing the light source devices 7 and 8. The circuit for energizing the light source devices 7 and 8 operates to energize the light source devices 7 and 8 as required during focus detection operation of the camera prior to exposure operation and details of the operation thereof are not described here because it is not related to the subject matter of the present invention. The camera C has a sub-mirror $M_2$ in addition to the main mirror $M_1$. The light from an object having passed through the objective lens 14 of the exchangeable lens EL passes through a light transmitting part of the main mirror $M_1$ be reflected by the sub-mirror $M_2$ downward and then to enter a focus detection device F.

Figure 2:
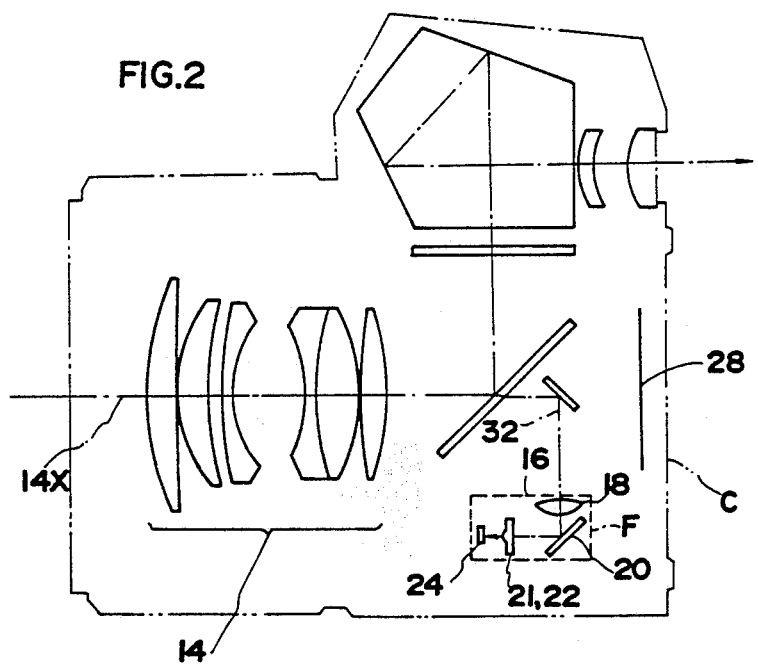
FIG. 2 illustrates a focus detection optical system of the focus detection system of FIG. 1.
Figure 3:
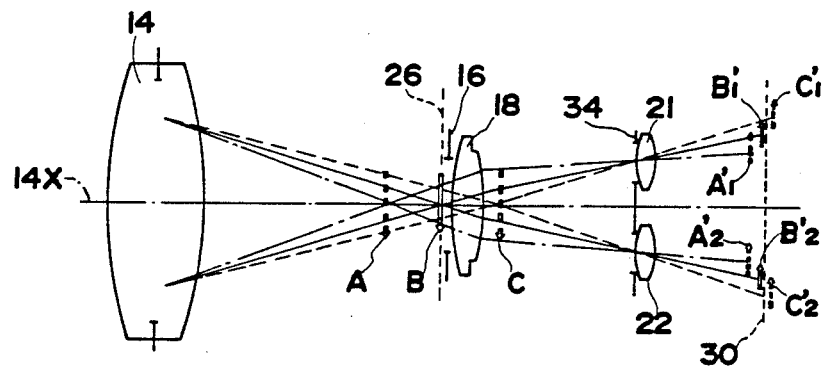
FIG. 3 is a development view showing the principle of focus detection by the focus detection optical system of FIG. 2.

FIGS. 2 and 3 illustrate an example of the optical system of the camera C shown in FIG. 1 and the focus detection optical system provided in the focus detection device F. In FIG. 2, 16 represents a field frame formed on a body of the device F for restricting the focus detection area. 18 represents a condenser lens; 20 a light path folding mirror; 21 and 22 a pair of reimaging lenses; 24 a self scanning image sensing device consisting of charge accumulation type i.e., (light integration type) image sensing device such as a CCD, for example. FIG. 3 which is a development view of the focus detection optical system consisting of these optical members shows the principle of focus detection of the phase difference detection type. 26 represent a predetermined imaging surface of the objective lens 14 which is equivalent to a film surface 28 of the camera. 30 represents a conjugate surface conjugate with the imaging surface 26 with respect to the reimaging optical system consisting of the condenser lens 18 and the pair of reimaging lenses 21 and 22. A front focus image A, an in-focus image B and a rear focus image C formed by the objective lens 14 are respectively re-imaged as the first and second images $A_1'$ and $A_2'$, $B_1'$ and $B_2'$, and $C_1'$ and $C_2'$ by the condenser lens 18 and the pair of reimaging lens 22. The positional relationship between the first and second images changes depending on the focus condition of the objective lens with respect to the object within the focus detection area. As a result, the focus condition of the objective lens can be detected by locating the image sensing device 24 on or at the vicintiy of the surface 30 and calculating the distance between the first and second images on the basis of outputs of the image sensing device 24. In FIG. 3, 14X represents the optical axis of the objective lens 14 and 34 represents an aperture mask which forms a pair of aperture openings just in front of the remaining lenses 21 and 22.

Figure 4:
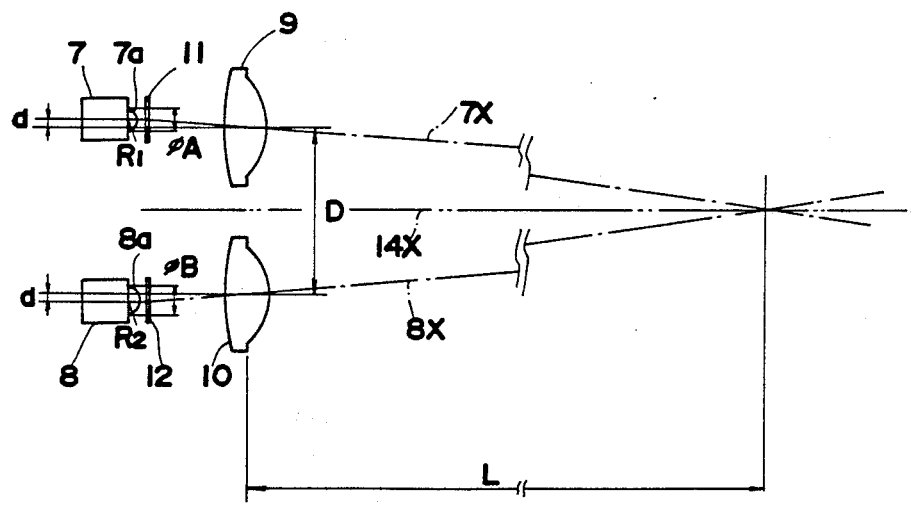
FIG. 4 is a plan view of the first and second light projecting optical systems of the lighting device of the first embodiment.

FIG. 4 is a plan view practically illustrating the light projecting optical systems of the lighting device of FIG. 1. The projection lenses 9 and 10 are disposed with an interval of D between the center thereof. The light source devices 7 and 8 respectively incorporate light emitting diodes (not shown). These devices 7 and 8 are arranged at a position a little backward (in the left side of the figure) from the point of focus of the projection lenses 9 and 10, respectively, so that their centers are respectively deviated by d from the optical axes of the projection lenses 9 and 10. Formed on these devices are spherical light condensing portions 7a and 8a having radius of curvature $R_1$ and $R_2$ ($R_1 < R_2$) and width of $\phi_A$ and $\phi_B$, respectively. Moreover, the projection pattern films 11 and 12 are accurately positioned substantially at the point of focus of the projection lenses 9 and 10 just in front of the spherical portions 7a and 8a so that the patterns described later are not deviated from each other. The spherical portions 7a and 8a of the light source devices 7 and 8 are condensers for collecting the light fluxes emitted from the light emitting diodes to the effective diameters of the projection lenses 9 and 10. But, since $R_1 < R_2$, the light flux projected by the projection lens 10 spreads at a wider solid angle than the light flux projected from the projection lens 9. Namely, the first light projecting optical system constituted by the light source device 7 and the projection lens 9 has a higher light condensing (collecting) capability than the second light projecting optical system constituted by the light source device 8 and the projection lens 10.

Figure 5:
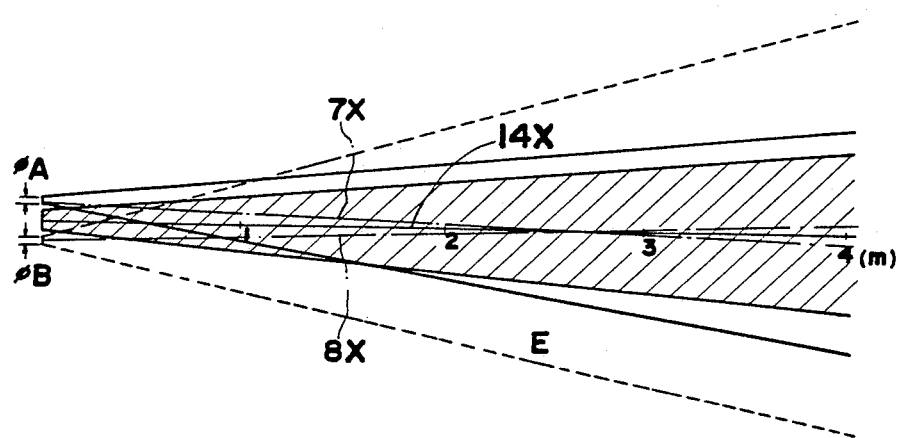
FIGS. 5 and 6 are a plan view and a side elevation view indicating positional relationship between the light fluxes projected from the first and second light projection optical systems of FIG. 4 and the focus detection area, respectively.
Figure 6:
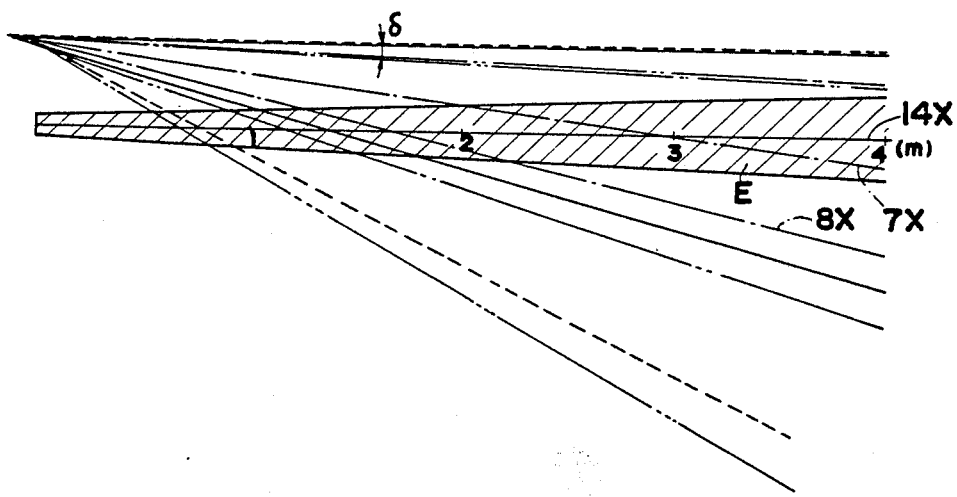

In FIGS. 5 and 6 which illustrate how the light fluxes projected from the first and second light projecting optical systems spread, the solid line indicates the light flux projected from the first light projecting optical system and the broken line the light flux projected from the second light projecting optical system. The area indicated by the hatching indicates the spread of focus detection area of the focus detection device F which is restricted by the field frame 16. As shown in FIGS. 4 and 5, the projection optical axes 7x and 8x of the first and second light projecting optical systems together cross the optical axis 14x of the objective lens at the predetermined distance L=3 m in the horizontal direction while crossing the optical axis 14x at the distances 3 m and 1.8 m in the vertical direction respectively as shown in FIG. 6. Namely, the two projection optical axes 7x and 8x are extending in such a fashion that they are twisted and such twist of projection optical axes can be realized by giving difference to distances in the vertical direction from the optical axes of light source devices 7 and 8 to the optical axes of the projection lenses 9 and 10, or by giving difference to the inclinations of the first and second light projecting optical systems as a whole in the vertical direction. As shown in FIG. 6, the spreads of the light fluxes projected from the first and second light projecting optical systems are determined so that both light fluxes almost overlap each other at the upper endside, while there are considerable discrepancy between the two at the lower end side. For example, in the case of the example shown in the figure, with respect to the vertical direction, the light flux projected by the first light projecting optical system starts to overlap the optical axis 14x of the objective lens at the distance of about 1.4 m and covers the focus detection area at the distance of not shorter than about 1.8 m while the light flux projected by the second light projecting optical system starts to overlap the optical axis 14x of the objective lens at the distance of about 0.8 m and covers the focus detection area at the distance of not shorter than about 0.9 m. On the other hand, regarding the horizontal direction, as shown in FIG. 5, the light flux projected by the first light projecting optical system starts to overlap the optical axis 14x at the distance of about 0.5 m and covers the focus detection area at the distance of not shorter than about 1.8 m, while the light flux projected by the second light projecting optical system starts to overlap the optical axis 14x at the distance of about 0.3 m and covers the focus detection area at the distance of not shorter than about 0.8 m. Namely, in the above case, the two light fluxes projected by the first and second light projecting optical systems perfectly overlap each other at the distance of not shorter than about 1.8 m , lighting the focus detection area, but only the light flux projected by the second light projecting optical system, or the light flux projected by the second light projecting optical system and a part of light flux projected by the first light projecting optical system light the focus detection area at the distance ranged from about 0.9 m to about 1.8 m. The distance L described above gives, as described later, the sharp est projected images of the projective patterns of the projective pattern films 11 and 12 and the two projected images overlap each other perfectly at this distance.

In case the optical axis of a projection lens is spaced by the distance m (hereinafter m is referred to as the basic line length) just above the optical axis of an objective lens, distance range (taken along the optical axis) capable of being lighted by the light flux projected by the projection lens (hereinafter referred to as illuminatable distance range) is determined by the basic line length m, a degree of spread of the light flux projected by the projection lens, an angle $\theta$ formed by the projection optical axis of the light projecting optical system as a whole including the projection lens and the optical axis of the objective lens and the distance L. from the proectin lens up to its point of focus while the spread of the light flux projected by the projection lens can be expressed by $f/\phi$ when the diameter of a light source is $\phi$ and the focal distance of the projection lens is f.

Figure 7:
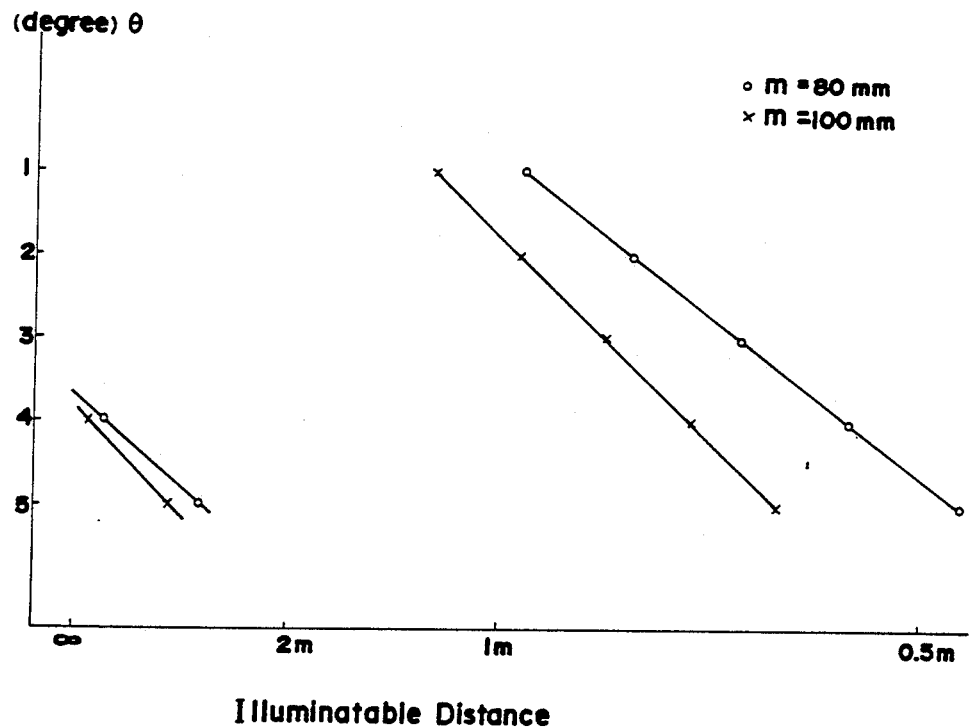
FIG. 7 is a graph indicating relationship between the angle formed by a light projecting optical axis and the optical axis of the objective lens and the lighting distance range.

FIG. 7 shows a graph indicating how the illuminatable distance range changes with change in the angle $\theta$ in the case of $f/\phi = 7.2$ and $L = 5$ m. The solid line indicates the change in the illuminatable distance range when $m = 80$ mm, while the broken line when $m = 100$ mm. As shown in this graph, as $\theta$ becomes larger, the illuminatable distance range moves to the side of near distance as a whole, and as m becomes smaller, the illuminatable distance range also moves to the side of near distance as a whole. The illuminatable distance range does not coincide with the focus detection distance range where focus detection is made possible since the focus detection distance range is set within the range where the focus detection area is covered by the light flux projected by the light projecting optical system. However, the focus detection distance range moves to the side of near distance as the movement of the illuminatable distance range to the side of near distance and moves to the side of far distance as the movement of the illuminatable distance range to the far distance side. Therefore, the tendency of the change in the illuminatable distance range shown by the graph of FIG. 7 is also applied to the focus detection distance range. However, it is essential for focus detection that an object lighted by the projected light flux has brightness higher than a certain level. Therefore, the practical longest limit of the focus detection distance range is restricted by the brightness of light source which is definite.

Meanwhile, in case the lighting device S having the first and second light projecting optical systems is mounted on a camera C by a mechanical coupling constituted by the leg 4 and the accessory shoe 2, it is difficult to avoid occurrence of play in the mechanical coupling, which results in change in the directions of the projection optical axes 7X and 8X of the first and second light projecting optical systems. The change in the directions of the projection optical axes leads to, for example, deflection of the projected light fluxes indicated by an angle $\delta$ in FIG. 6 in the vertical direction (the two dotted chain line and the three dotted chain line indicate the light fluxes projected by the first light projecting optical system and the second light projecting optical system and deflected by the coupling play, respectively.) Such deflection of the light fluxes certainly gives influence on the focus detection distance range and degree of such influence is larger in the far distance range than in the near distance range. However, influence by deflection of the projected light fluxes can be suppressed to be comparatively small in practice in case where the light fluxes projected by the first and second light projecting optical systems substantially overlap each other at the upper end and intersect the focus detection area at the longer distances (refer to FIG. 6), since the focus detection distance range is limited by the brightness of light source in the far distance side.

Figure 8A:
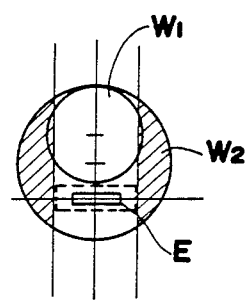
FIGS. 8A and 8B respectively illustrate overlapping conditions of the light fluxes projected from the first and second light projecting optical systems at the distances of 1 m and 5 m and positional relationship between the overlapping conditions and the focus detection area.
Figure 8B:
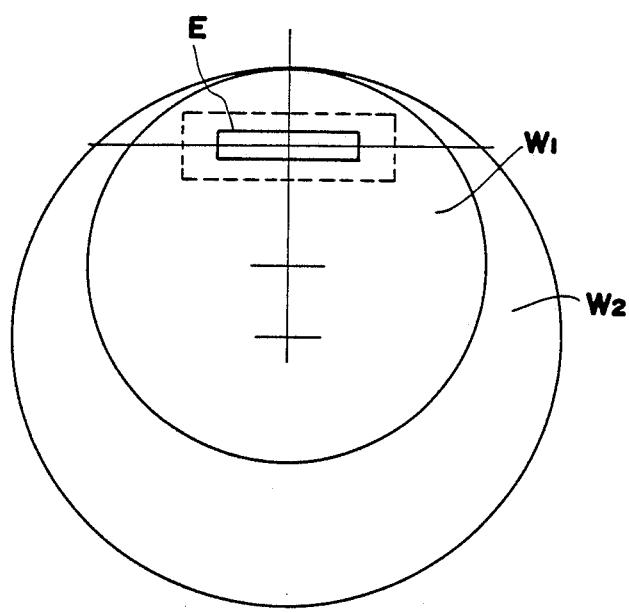

FIGS. 8A and 8B respectively show how the light fluxes projected by the first and second light projecting optical systems overlap each other at the distances of 1.0 m and 5.0 m in the first embodiment described above, together with the focus detection area. In these figures, $W_1$ and $W_2$ represent the cross-sections of the light fluxes projected by the first and second projection optical systems and E represents the focus detection area. It should be understood that the positional relationship between the cross-sections $W_1$ and $W_2$ of the light fluxes and the focus detection area E is illustrated in these figures with the side of the cross-sections of the light flux taken as a reference. Accordingly it is seen that the focus detection area E moves relative to the cross-sections $W_1$ and $W_2$ of the light fluxes within the range indicated by the broken line due to the coupling play between the lighting device S and the camera C.

Figure 9:
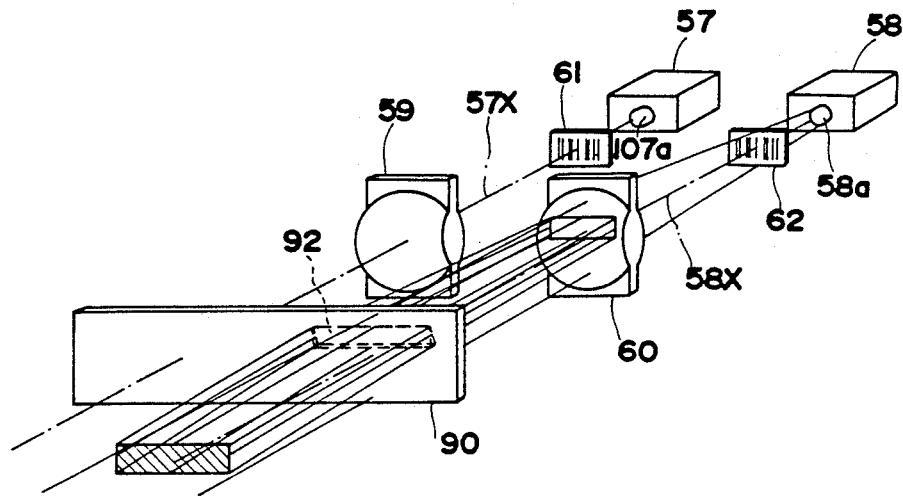
FIG. 9 is a perspective view of first and second light projecting optical systems of a lighting device according to a second embodiment of the present invention.

According to the first embodiment, the light flux projected by the second light projecting optical system for illumination of a near distance area spreads in the transverse direction to the extent unnecessary for the focus detection even in case the coupling play between the lighting device S and the camera C is considered. That is, a part of the light flux deflected in the transverse direction from the focus detection area E (a cross-section of such a part being indicated by hatching in FIG. 8A) does not contribute to the illumination of the focus detection area. FIG. 9 shows a lighting device according to a second embodiment of the present invention which can improve the lighting efficiency by reducing such ineffective light flux.

Figure 57:
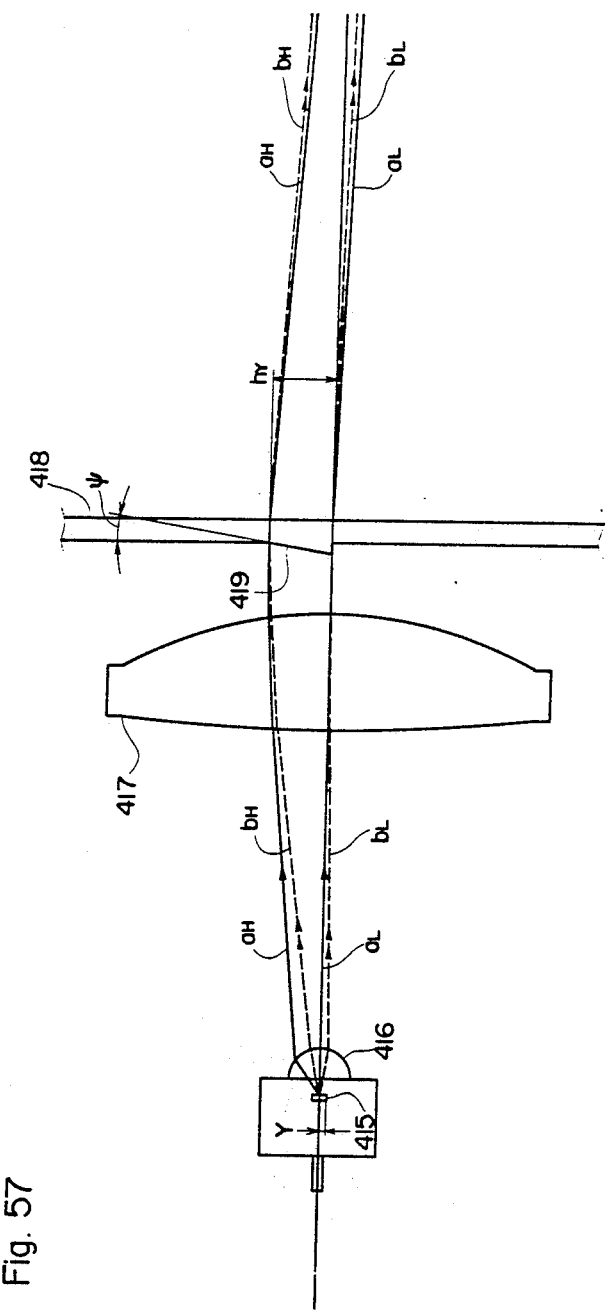
FIG. 57 is the same view as FIG. 55, wherein the prism 419 is arranged at a position closer to the projection optical axis of the light projecting optical system than in FIG. 55.

In FIG. 9, 57 and 58 represent light source devices constituted by light emitting diodes (not shown) and light collecting portions 57a and 58a formed as spheres of the same radius. First and second projection lenses 59 and 60 have the equal focal length and projective pattern films 61 and 62 are respectively provided at the focal points thereof. A transparent protective panel 90 arranged in front of the projection lenses 59 and 60 has a prism or optical wedge 92 at its region where the light flux projected by the projection lens 60 transmits. The prism 92 is formed at the rear side of the panel 90. The width of prism 92 is comparatively small as compared with the width of the projected light flux in the vertical direction but is almost equal to the width of the projected light flux in the horizontal direction. As is apparent from the figure, the prism 92 has the section of triangle and the lower part is thicker than the upper part. The section indicated by the hatching indicates a part of the projected light flux which has passed through the prism 92 and this part is about 10% of the whole light flux projected by the second light projecting optical system.

Figure 10:
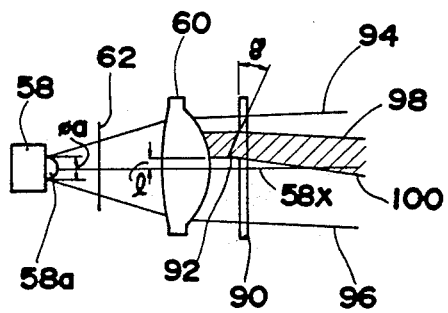
FIG. 10 is a side elevation view of the second light projecting optical system of FIG. 9.

In FIG. 10 illustrating only the second light projecting optical system, pencils of light 94 and 96 passing through the outer most part (in the vertical direction) of the projection lens 60 pass the flat part of panel 90. Since the front and rear surfaces of the panel 90 are parallel with each other at the area through which these pencils of light pass, the directions of the pencils of light are unchanged in front of and at the back of the panel 90. Meanwhile, pencils of light 98 and 100 passing the upper and lower ends of the prism 92 are deflected downward by the angle of half the vertical angle $\phi$ of the prism 92.

Figure 11:
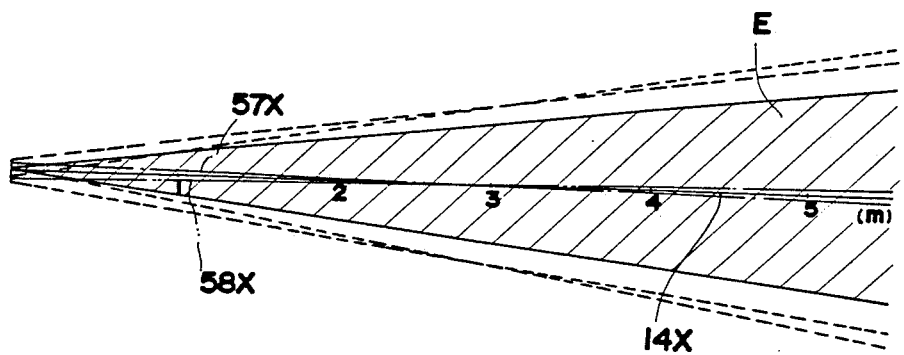
FIGS. 11 and 12 are a plan view and a side elevation view indicating positional relationship between the light fluxes projected from the first and second light projecting optical systems of FIG. 9 and the focus detection area, respectively.

Referring to FIG. 11 illustrating the paths, viewed from the vertical direction, of the light fluxes projected from the first and second light projecting optical sstems in the second embodiment, the projection optical axes 57X and 58X of the first and second light projecting optical systems cross the optical axis 14X of the objective lens at the distance of 3 m, respectively.

Figure 12:
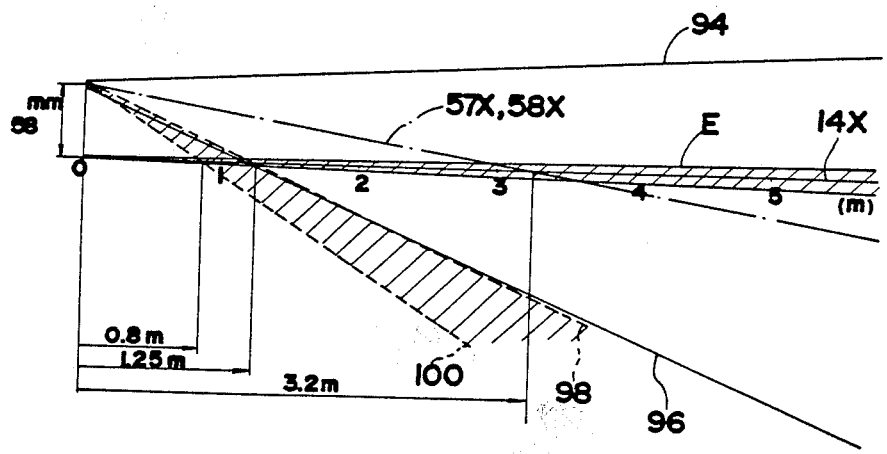
Figure 13:
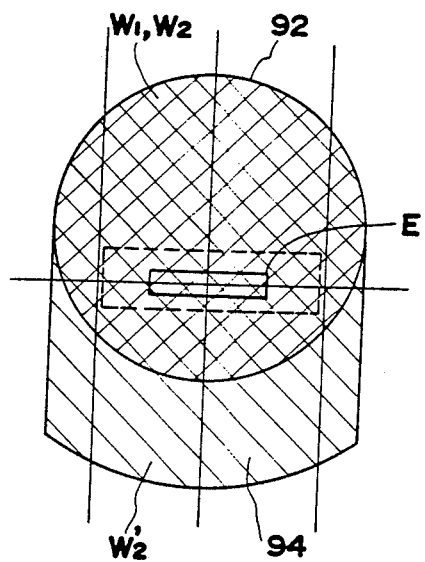
FIG. 13 illustrates the overlapping condition of the light fluxes projected from the first and second light projecting optical systems at the distance of 2 m in the second embodiment and positional relationship between such condition and the focus detection area.

FIG. 12 illustrates the light paths of the second embodiment where the focal lengths f of the first and second projection lenses 59 and 60 are set to 22 mm, widths $\phi$ of portions 57a and 58a are set to 2.4 mm, the basic line length m is set to 108 mm, the angle $\phi$ is set to 7°, and moreover the optical axes 57X and 58X of the first and second light projecting optical systems cross the optical axis 14X of objective lens at the distance of 3.2 m respectively, viewed from the horizontal direction. The region between pencils of light 94 and 96 indicates the range of spread of the projected light flux which does not pass the prism 92. This range covers the focus detection area E at the distance of not shorter than about 1.2 m. Meanwhile, the region defined by pencils of lights 98 and 100 indicates the range of spread of the light flux which has passed through the prism 92. This range covers the spread of focus detection area E in the range from the distance of about 0.8 m to the distance of about 1.25 m. FIG. 13 is a cross-section of the light fluxes in the second embodiment at the distance of about 2 m. The area within a circle 92 indicates the cross-sections $W_1$ and $W_2$ of the projected light fluxes which have not passed through the prism 92 and the area 94 outside the circle indicates the cross-section $W_2'$ of the light flux which has passed through the prism 92. In this second embodiment, the degree of spread of the light fluxes passing through the projection lenses 59 and 60 of the first and second light projecting optical systems is set equal to each other and the light flux having passed through the second projection lens 60 is spreaded by the prism 92 only in the vertical direction. Therefore, as is apparent from comparison of FIG. 13 and FIGS. 8a and 8b, a part of light flux which does not contribute to the illumination of the focus detection area E can be reduced as compared with the first embodiment.

In the second embodiment, difference is generated in the intensities of the light flux having passed through the prism 92 in accordance with the amount of separation l (refer to FIG. 10) of the prism 92 in the vertical direction from the optical axis 58x of the projection lens 58. Such difference is generated because the light emitted from the light emitting diode included in the light source device 58 has an intensive directivity toward the optical axis 58x of the projection lens 58. Therefore, the light flux which is collected by the condenser portion 58a and then directed to the projection lens 60 becomes more intensive at its portion closer to the optical axis 58x of projection lens. Accordingly, as the amount of separation l is set smaller, the light flux having passed through the prism 92 is more intensified. Namely, the intensity of the light flux can be set arbitrarily by selecting the amount of such separation as described later in detail.

Figure 14:
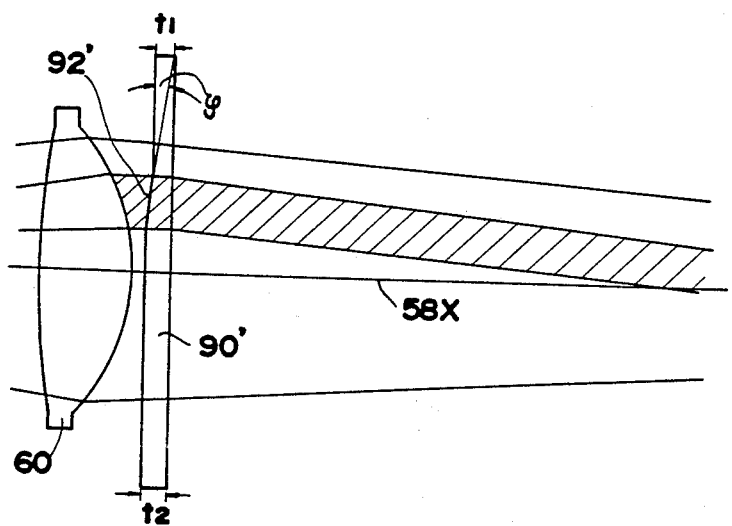
FIGS. 14 and 15 are side elevation views of second light projecting optical system according to first and second modifications of the first and second embodiments, respectively.

FIG. 14 illustrates only the a principal part of the second light projecting optical system in a first modificating of the second embodiment. In this modification, a prism 92' is formed as the inclined surface at a transparent panel 90' so that the panel 90' has the thicknesses $t_1$ and $t_2$ of the two stages at the upper and lower sides of the inclined surface. A part of the panel 90' where the light flux from the first projection lens not shown but corresponding to the lens 59 passes is formed as the parallel plate of thickness $t_1$ (or may be $t_2$). In the range shown in the figure, the light flux projected by the projection lens 60 is being converged. This light flux is once converged at a position near the panel 90' (outside the figure) and thereafter diverged to cover the focus detection area within a wider distance range.

Figure 15:
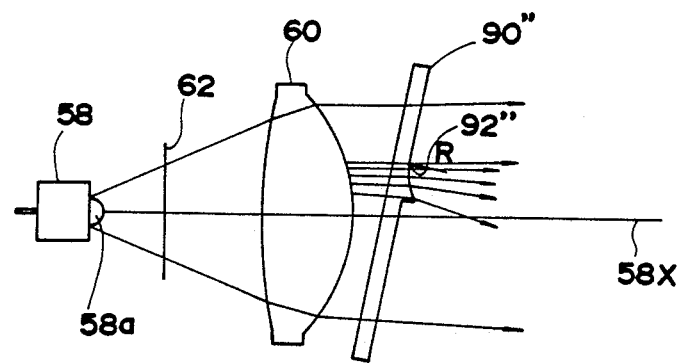

FIG. 15 illustrates the second light projecting optical system in a second modification of the second embodiment. Panel 90" is inclined with respect to the projection optical axis 58x and formed with a prism 92" which has a curved surface recessed cylinrically with the radius R. Since this prism 92" has the curved surface recessed cylindrically, the projected light flux which has passed through the prism is diverged as indicated in the figure and the intensity of the light flux becomes higher at the upper part, while becomes lower at the lower part. Therefore, in the distance range where the light flux projected by the projection lens 60 covers the focus detection area, the illumination or lighting becomes weaker in the nearer distance but is more inetnsified at the farther distance, improving the lighting efficiency.

The lighting efficiency can further be improved by forming a cylindrical prism having an aspherical cross-section in place of the prism 92". The prism 92" does not give any adverse effect for projection of a projective pattern consisting of vertical stripes described later.

Figure 16:
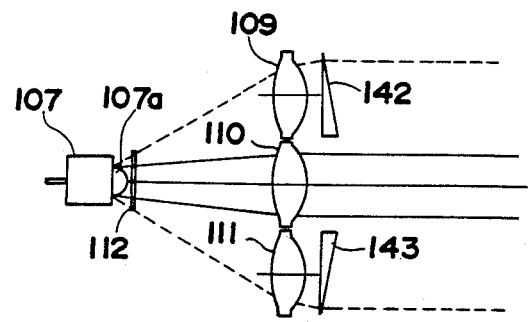
FIG. 16 is a side elevation view of a light projecting optical system according to a third embodiment of the present invention.
Figure 17:
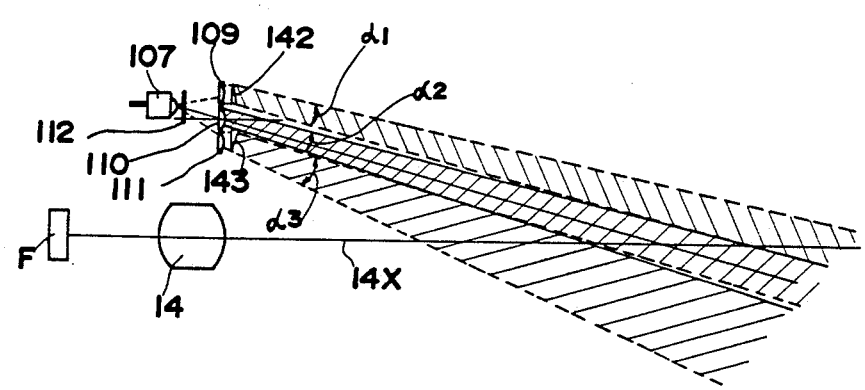
FIG. 17 is a side elevation view of the light fluxes projected from the light projecting optical system of FIG. 16.

FIG. 16 illustrates a lighting device according to a third embodiment of the present invention. The lighting device of this embodiment is provided with first, second and third light projecting optical systems while only one light source device 107 having a spherical condenser portion 107a is used in common as the light source of these light projecting optical systems. Since the projective film pattern 112 is used also in common for the first, second and third light projecting optical systems, positioning of separate projective pattern films is no longer necessary, unlike the first and second embodiments. In FIG. 16, projection lenses 109, 110 and 111 belonging to the first, second and third light projecting optical systems respectively are stacked in the vertical direction as shown. Prisms 142 and 143 belonging to the first and third light projecting optical systems respectively have a cylindrically recessed spherical or aspherical curved surface as shown in FIG. 15. In this embodiment, the light fluxes emerging from the spherical condenser portion 107a of the light source device 107 are splitted into first, second and third projected light fluxes and the first and third projected light fluxes among them are refracted by the prisms 142 and 143 in such a direction as coming close in parallel to the projection optical axis of projection lens 110. Thereby, the first, second and third projected light fluxes respectively illuminate, as shown in FIG. 17, a far distance region, intermediate distance region and near distance region. In case the angles of the spread of the first, second and third projected light fluxes in the vertical direction is $\alpha_1$, $\alpha_2$ and $\alpha_3$, the lighting efficiency can be improved by setting these angles in the relation as $\alpha_1 < \alpha_2 < \alpha_3$ by changing the focal lengths of the projection lenses 109, 110 and 111.

Figure 18:
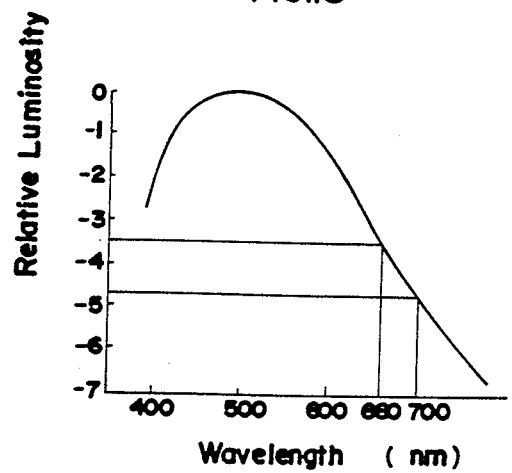
FIG. 18 is a graph illustrating the relationship between relative luminosity (stimulus to human eyes) and wavelength.

It has already been described that various problems are still unsolved for practical use of focus detection systems utilizing an auxiliary light from a lighting device and that a typical problem among them is improvement of lighting efficiency for objects within a distance range from a near to far distances. Moreover, selection of a light source for producing an auxiliary light and the wavelength of the auxiliary light and selction of a projective pattern are also remaining as the subject to be further discussed. A problem of a light source for producing an auxiliary light and the wavelength of the auxiliary light is described first. As a light source, those which consumes less power are desirable, and currently a light emitting diode is just suitable. In case a light emitting diode is used as the light source for focus detection, efficiency for converting electrical energy into light energy, a degree of stimulus of lighting for human eyes and influence on chromatic abberation of an objective lens must be considered. Here, efficiency for converting electrical energy into light energy depends on the length of the light emitted by a light emitting diode and such energy generally becomes higher as the wavelength becomes longer. Meanwhile, if a person is irradiated with a light having high degree of stimulus for human eyes by his face, he will close his eyes because he feels dazzling. Therefore, a picture is taken disadvantageously while he is closing his eyes. As shown in FIG. 18 in which logarithmic values are plotted on the vertical axis, the degree of stimulus also depends on wavelength and it has a tendency to become smaller while wavelength becomes longer within the range from almost the center of visible light region to the infrared region. For example, in the case of the light having the wavelength of 700 nm, the degree of stimulus becomes about 1/10 of that of the light having the wavelength of 660 nm. From this point of view, it seems desirable to use so-called infrared light as the auxiliary light for focus detection. However, an infrared light gives too large influence on the chromatic aberration of an objective lens. As such influence changes largely due to the change in focal length of the objective lens and the change in the position of the objective lens moved for focusing, it is very difficult to accurately correct difference in amount of chromatic aberration between the infrared light and the visible light. As a result, it can be said that it is most desirable in total to use a light emitting diode which emits the light of almost single wavelength of about 700 nm as the light source for producing auxiliary light for focus detection.

Figure 19:
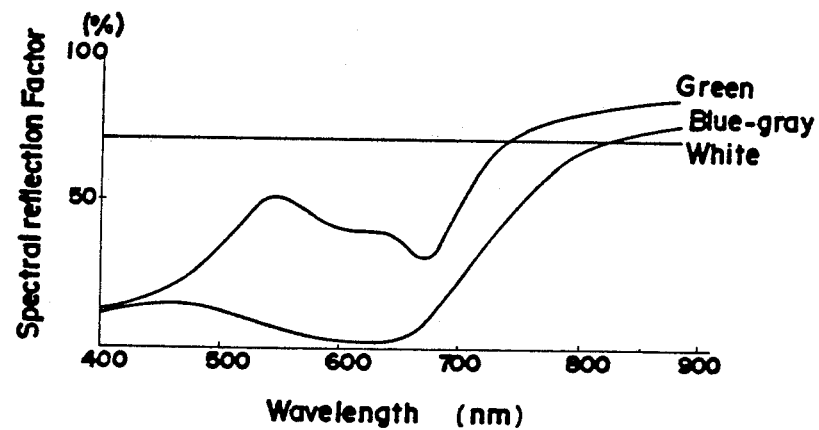
FIG. 19 is a graph of spectral reflectivity of green, blue-gray and white substances.

However, there is another problem in case a light emitting diode is used as the light source. Namely, light emitted from a light emitting diode is similar to a monochromatic light having the spread of only about 50 nm while sensitivity of light sensing elements of the image sensing device 24 is spreading in the range from about 380 nm to 780 nm, so that difference is generated in the contrast of the object sensed by the image sensing device between the case where the object is lighted by a natural light or a fluorescent lamp and the case where it is lighted by the light emitted from the light emitting diode. Namely, almost all substance tends to have a larger reflectivity as the wavelength of light lighting the same becomes longer. In general, difference in contrast becomes smaller than difference in colors for the light with the wavelength of about 700 nm. Therefore, upon sensing by the image sensing device, a substance which shows a high contrast under the illumination by natural light often shows low contrast under the illumination by the light emitted from the light emitting diode. FIG. 19 shows a spectral reflection factors of a green, bluegray and white objects. For the light of wavelength near 700 nm, difference in reflectivity between green and blue gray objects is smaller than that for the light of 500 to 600 nm which is at the center of visible light region. When contrast of an object is thus lowered by the illumination by an auxiliary light, the focus detection accuracy is deteriorated in general in the T.T.L. focus detection systems (the focus detection is disabled in an extreme case), making it meaningless to use the auxiliary light. Namely, if there is no contrast on an object it is difficult to detect the coincidence between the two reimaged images even in the case of the T.T.L. focus detection system of the phase difference detection type described above and therefore this problem becomes a serious defect if it is left unsolved.

In order to solve such a problem, a light emitting diode which emits the light of almost single wavelength of about 700 nm is used as a light source of the light source devices 7, 8, 57, 58 and 107 (as a such light emitting diode, a light emitting diode of GaA As type recently developed as the light source for optical fiber communication is most desirable) and at the same time projective pattern films 11, 12, 61, 62 and 111 are arranged at the focal point of the projection lenses 9, 10, 59, 60 and 109.

Figure 20:
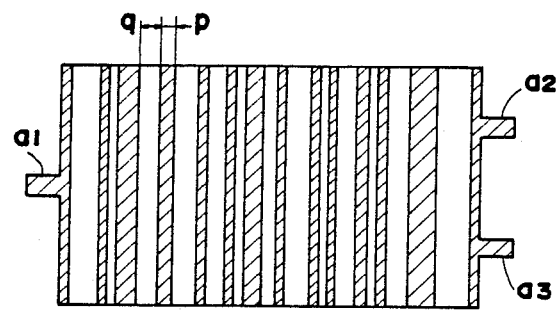
FIG. 20 is a plan view illutrating an example of projective pattern film.
Figure 21:
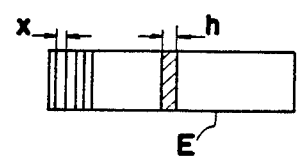
FIG. 21 illustrates a projective pattern image consisting of a single opaque part projected on a plain object, wherein the image is viewed together with a field frame from the focus detecting surface where the image sensing device is located.

FIG. 20 illustrates an example of projection pattern films 11 and 12 used for the above embodiments. This film is provided with a projection pattern consisting of vertical stripes. In the figure, the hatched areas represent opaque parts, while the remainder represent transparent parts. When the width of an opaque part is defined as p, while the width of a transparent part is defined as q, p and q are respectively different at each of the opaque and transparent parts and the repetition pitch (p+q) is completely irregular. The projective pattern films 11 and 12 are arranged, for example, as shown in FIG. 4 near the rear focal point of the projection lenses 9 and 10, respectively. The projection lenses 9 and 10 project the images of the projective patterns on an object. Even when the contrast on the object becomes small with the illumination by the light from a light emitting diode of almost single wavelength as described above, the images of the projective patterns provide the object with sufficiently high contrast. The contrast thus provided solves the problem of difficulty of focus detection by the T.T.L. focus detection system. Since the films 11 and 12 are located near the rear focal point of the projection lenses 9 and 10 respectively, the images of projective patterns become sharpest at the location in the distance L of FIG. 4 to overlap each other perfectly.

Widths of the opaque parts of the projective pattern of the film described above are determined as explained below, considering the width of each light sensing element of the image sensing device 24, for example, CCD, used in the focus detection system.

Figure 22:
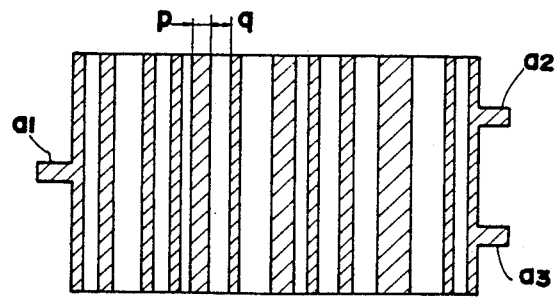
FIG. 22 is a plan view illustrating another projective pattern film.

FIG. 22 illustrates image of a projective pattern consisting of a single opaque part projected on a plain object, which is viewed from the focus detection surface together with the field frame. From the point of view of the optical system shown in FIG. 3, FIG. 22 illustrates one of the two projective pattern images reimaged on the light sensing surface of the image sensing device positioned at the plane 30 and the focus detection area E which is the image of the field frame 26. In this figure, x represents a width of each light sensing element of the image sensing device, namely CCD, while h represents a width of the image of the opaque part of the projective pattern reimaged on the image sensing device. When x>h, the signal output of the light sensing element on which the image of the opaque part of the projective pattern is formed not only becomes weak but also does not change even when the image of the opaque part of the projective pattern moves within the area of the light sensing element. Therefore, position of the image of the opaque part of the projective pattern on the image sensing device cannot be detected accurately. In contrast, when x<h, such problem is not encountered. However, it is not desirable that h is excessively larger than x because, if so, there is a fear that the focus detection area as a whole may be occupied by the image of the opaque part of the projective pattern. Moreover, as a practical problem, aberration of the objective lens and brurring of the projective pattern image on the image sensing device dependent on the focusing condition widen the width h of the image of the opaque part of the projective pattern and makes difference in outputs of the adjacent two light sensing elements smaller than it is, whereby it is difficult to carry out focus detection by detecting coincidence between the two images reimaged on the image sensing device. As a consequence, a comparatively desirable result can be obtained by setting a value of h to the range of about $3h \geq x \geq h/2$ under the focused condition where the projective pattern image is focused on the image sensing device and by always forming a plurality of images of opaque parts as the projective pattern image within the focus detection area. However, the width h of the image of the opaque part of the projective pattern on the focus detection surface differs depending on the angle of field of the objective lens, for example, a kind of interchangeable lens attached to the camera. Namely, it becomes narrower for a wide angle lens as compared with a standard lens but becomes wider for a telephoto lens. Accordingly it is desirable to take it consideration that the angles of fields of all interchangeable lenses to be used satisfy the above condition. Meanwhile, when a plurality of opaque parts of an equal width are provided on the projective pattern, the two projective pattern images formed by the reimaging lenses 21 and 22 coincide with each other at a plurality of positions in the case of the focus detection system of the phase difference type shown in FIG. 3, resulting in failure of correct focus detection. In the case of a wide angle lens, the focus detection area becomes comparatively wide. Therefore, when the same arrangement of some opaque and transparent parts is repeated in the projection pattern, the same images of the opaque and transparent parts are repeatedly formed within the focus detection area, also resulting in failure of correct focus detection. For these reasons, the film of FIG. 20 has the projective pattern in which not only the width p of opaque parts but also the repetition pitch (p+q) of the opaque and transparent parts are perfectly irregular. The arrangement and the width of the opaque and transparent parts of the projective pattern are determined as described above. However, in case the lighting device S is coupled with the camera C by means of a mechanical coupling means like the embodiments described above, it is desirable to increase the number of the opaque parts, considering a margin of deflection angle δ due to the coupling play, as compared with the case where the lighting device S is fixedly provided on the camera C.

In the projection pattern of the projection pattern film shown in FIG. 20, the opaque parts having a narrower width are arranged at a comparatively narrow interval while the opaque parts having a wider width are arranged at a comparatively wider interval. This makes it possible to detect the coincidence between the two images formed by the reimaging lenses 21 and 22, based on the projected images of the narrower opaque parts in case in focus detection area becomes relatively narrow by use of a telephoto lens, and based on the projected images of the wider opaque parts in case the focus detection area becomes relatively wider by use of a wide angle lens. Accordingly, influence on focus detection capability resulting from difference in the angle of field of an interchangeable lens can be reduced as much as possible.

FIG. 22 illustrates a modification of the projective pattern film shown in FIG. 20. Also in this modification, the widths p and q of the opaque parts and the transparent parts of the projective pattern are respectively different and the pitch (p+q) is irregular.

The opaque parts at opposite lateral ends of the two projective pattern films films described above are formed with protruded portions $a_1$, $a_2$ and $a_3$. The protrusion $a_1$ is located at the intermediate position between the protrusions $a_2$ and $a_3$ in the vertical direction. The projective pattern can be positioned in the first and second projection optical systems by observation of projected images of these protrusions.

Figure 23:
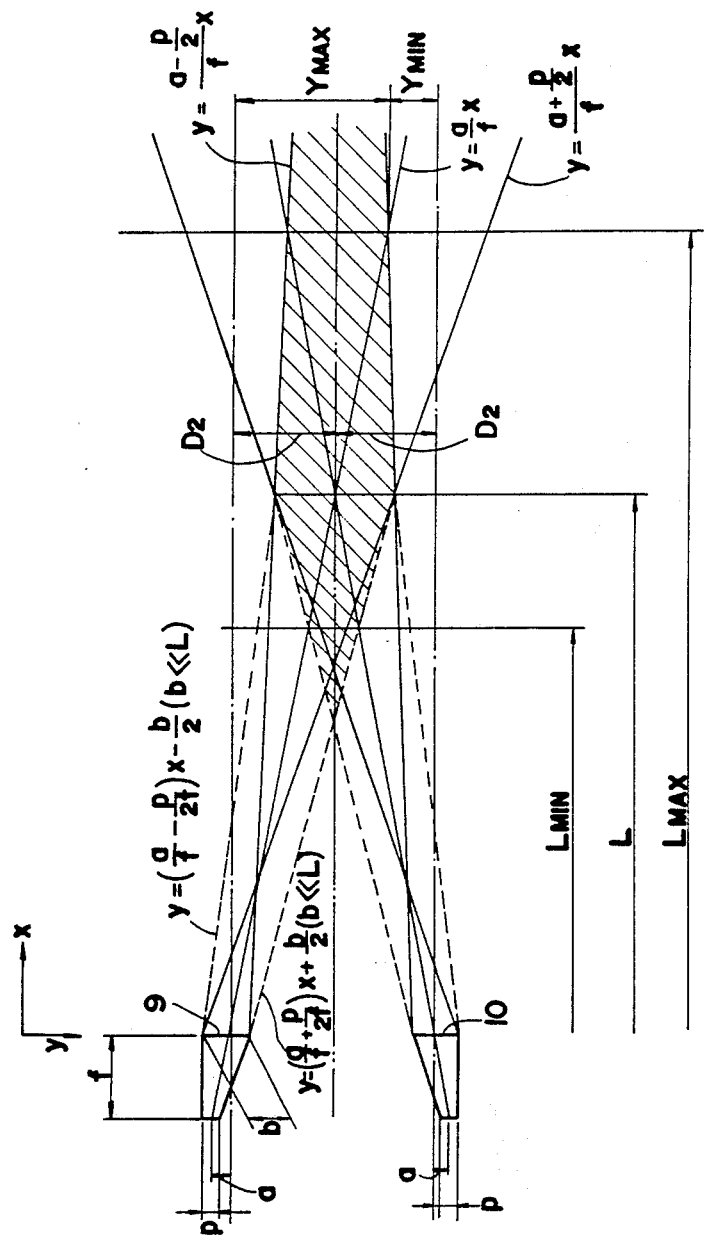
FIG. 23 illustrates the range of overlapping of the two projective pattern images in the case where the projective pattern film is arranged as shown in FIG. 4 within the first and second light projecting optical systems.
Figure 24:
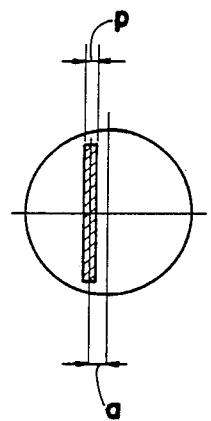
FIG. 24 illustrates the position of the projective pattern relative the optical axis of the projection lens in FIG. 23.

FIG. 23 illustrates the range of overlapping of the projected pattern images in the case where the projective pattern films are arranged in the first and second light projecting optical systems as shown in FIG. 4. For brevity of explanation, it is assumed that only one opaque part of width p is provided as shown in FIG. 24 in the respective projective patterns at the area spaced to the outside by the distance a from the optical axis of the respective projection lenses in the horizontal direction. Moreover, it is also assumed that the focal length and the diameter of the respective projection lenses are f and b, respectively. The distance between the optical axes of the two projection lenses is D and the distance to a position where the projected images of two patterns perfectly coincide with each other is L. Here, in order to determine the degree of overlapping of the images of the two projected patterns at the areas in front of and at the back of the position of the distance L, the distance $L_{MIN}$ and $L_{MAX}$ to the positions where the overlapping area becomes ½ in the respective projected images are obtained below. In this case, the coordinate x is plotted forward in parallel to the optical axes of the projection lenses 9 and 10 from the positions of these projection lenses, while the coordinate y is plotted in the direction crossing the coordinate x at the right angle on the horizontal surface from the optical axis of one of the projection lenses.

$$\text{When } x \geq L, \ Y_{max} = \frac{a + P/2}{f} X = \left(\frac{D}{2L} + \frac{P}{2f}\right)X \quad (1)$$

$$Y_{min} = \frac{a - P/2}{f} X = \left(\frac{D}{2L} - \frac{P}{2f}\right)X \quad (2)$$

$$\text{When } x < L, \ y_{max} = \frac{a + P/2}{f} X + \frac{b}{2} = \quad (3)$$

$$\left(\frac{D}{2L} - \frac{P}{2f}\right)X + \frac{b}{2}$$

$$Y_{min} = \frac{a - P/2}{f} X - \frac{b}{2} = \left(\frac{D}{2L} - \frac{P}{2f}\right)X - \frac{b}{2} \quad (4)$$

Wherein, b<<L, and $Y_{max}$ and $Y_{min}$ respectively indicate the outermost pencils of light of the light flux having passed through one of the projection lenses for projection of the image of the corresponding projective pattern. On the other hand, the center pencil of light of this light flux is expressed by $$y = \frac{a}{f} X \quad (5)$$

In this case, the conditions where the two light fluxes for projection of the images of the projective patterns overlap each other in half or more can be expressed as indicated below:

when $x \geq L$, $y + y_{min} \geq D$ (6)

when $x < L$, $y + y_{max} \geq D$ (7)

From the equations (2), (3), (5), (6) and (7), the following relations can be obtained.

$$L_{MAX} = \frac{f}{2a - p/2} \cdot D = \frac{1}{1/L - p/2fd} \quad (8)$$

$$L_{MIN} = \frac{D - b/2}{2a/f + p/2f} = \frac{D - b/2}{D/L + p/2f} \quad (9)$$

For example, when L=3 m, f=18 mm, p=0.1 mm, b=8 mm and D=20 mm, $L_{MAX}$=5.1 m and $L_{MIN}$=1.7 m are obtained from the equations (8) and (9) and $L_{MAX}$=6.4 m and $L_{MIN}$=1.4 m can be obtained only by changing D to 15 mm. Also, $L_{MAX}$=6.0 m and $L_{MIN}$=1.6 m can be obtained only by changing p to 0.12 mm. from these facts, overlapping of the two projected pattern images can be kept at ½ or more in wider range if the distance D between the two projection lenses is set to a small value or the width p of the opaque part of the respective projection patterns is set to a large value.

When the degree of overlapping of the two projected pattern images is reduced, contrast of the projected pattern images on an object is lowered correspondingly and it becomes difficult to detect coincidence between the two images of the object formed on the image sensing device by the reimaging lenses. The overlapping of the two projected pattern images at ½ or more area is a practical condition for allowing the detection of the coincidence between the two images of the object and this condition is more severe in the near distance side than in the far distance side (the distance range starting from the point of distance L becomes narrower in the near distance side than in the far distance side). However, the projected light flux is intensive in the near distance side, so that even in case the degree of the overlapping of the two projected pattern images is smaller than ½, the contrast of the projected pattern images on an object tends to be kept comparatively high in the near distance side. Therefore focus detection is actually made possible even in distances nearer than the $L_{MIN}$ obtained by the equation (9).

Figure 25A:
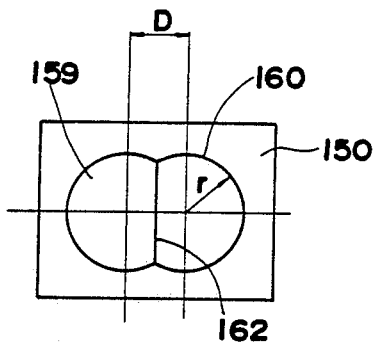
FIGS. 25A and 25B are a plan view and a side elevation view of the first and second projection lenses integrated as a composite type projection lens.
Figure 25B:
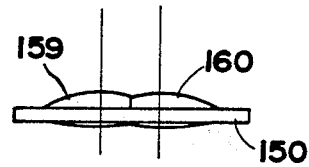

FIGS. 25A and 25B illustrate composite type projection lenses which have reduced distance D. It should be recalled that the degree of the overlapping of the two projected pattern images can be kept at the predetermined value or more by setting the distance D to a small value. The two projection lenses 159 and 160 are integrally formed on a single transparent plate 150 made of a synthetic resin to be in contact with each other at the boundary 162. When the radius of the respective lenses 159 and 160 is r, the distance D between the lenses is set as D<2r.

The first to third embodiments of the present invention and some modifications thereof have been described but still further modifications to the embodiments can be thought of. For example, the lighting device S may be provided on an accessory independently of an electronic flash device. The lighting device S can be mounted not only on the accessory shoe of the camera but also on any desired part of the camera when the camera is provided with a suitable coupling member. Moreover, the lighting device S can be fixedly provided on the camera body. In this case, it is desirable that the lighting device is provided just above, just below or just aside the objective lens of the camera because the focus detection area is extending while generally spreading in the lateral direction and vertical direction, but this is not essential to the present invention.

Next, explanation is given of embodiments of the present invention which have improved light source devices.

Figure 26:
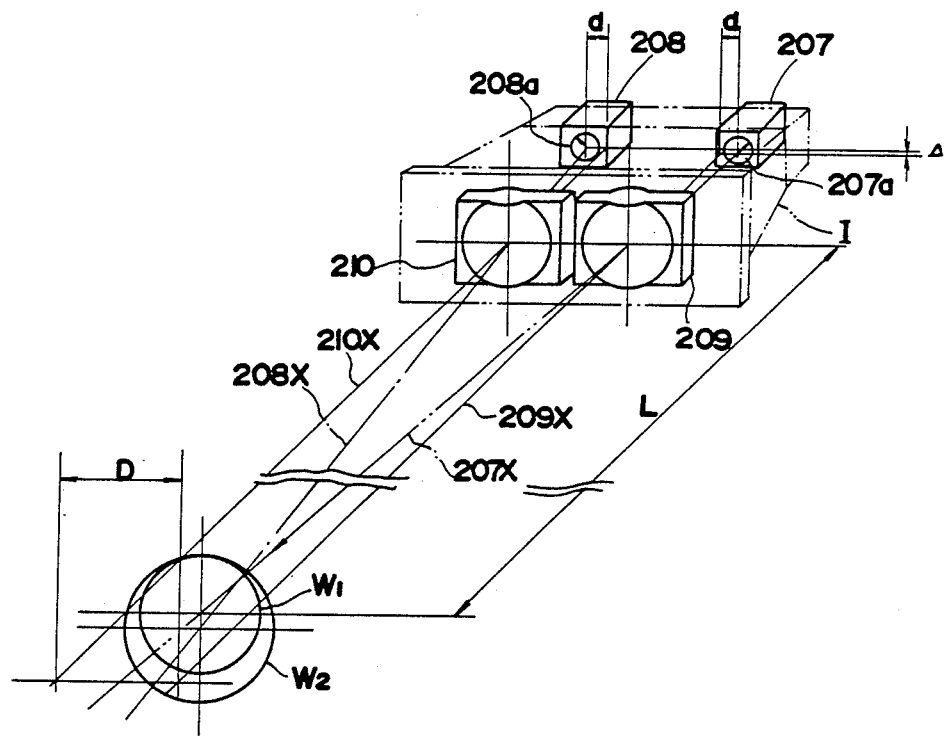
FIG. 26 is a perspective view of first and second light projecting optical systems of a lighting device according to a fourth embodiment of the present invention.

Referring to FIG. 26 showing first and second light projecting optical systems of a lighting device according to a fourth embodiment of the present invention, 209 and 210 denote projection lenses of the same shape. The lenses 209 and 210 are disposed so that the respective optical axes 209X and 210X are parallel to each other and spaced by a distance D. 207 and 208 denote light source devices which are disposed behind the projection lenses 209 and 210 respectively so that optical axes 207X and 208X thereof intersect each other at a position spaced by a distance L from the projection lenses 209 and 210. More specifically, the light source devices 207 and 208 are provided at their front faces with spherical light condensing molded portions 207a and 208a. The centers of the spherical surfaces of the portions 207a and 208a are spaced by a distance d in directions opposite to each other from the optical axes 209X and 210X of the projection lenses. When radii of curvature of the spherical surfaces of the molded poritons 207a and 208a are $r_1$ and $r_2$, respectively, r is larger than $r_1$. In the vertical direction in the figure, the centers of both spherical faces are deviated from each other by the difference $\Delta(=r_2-r_1)$ between the radii of curvature so that lower ends of both spherical surfaces coincide with each other. Thus, the illumination area $W_2$ illuminated by the light flux from the light source device 208 and the illumination area $W_1$ illuminated by the light flux from the light source device 207 are always coincident with each other at their upper ends and the illumination area $W_1$ is included in the illumination area $W_2$, as shown in the figure.

Figure 27:
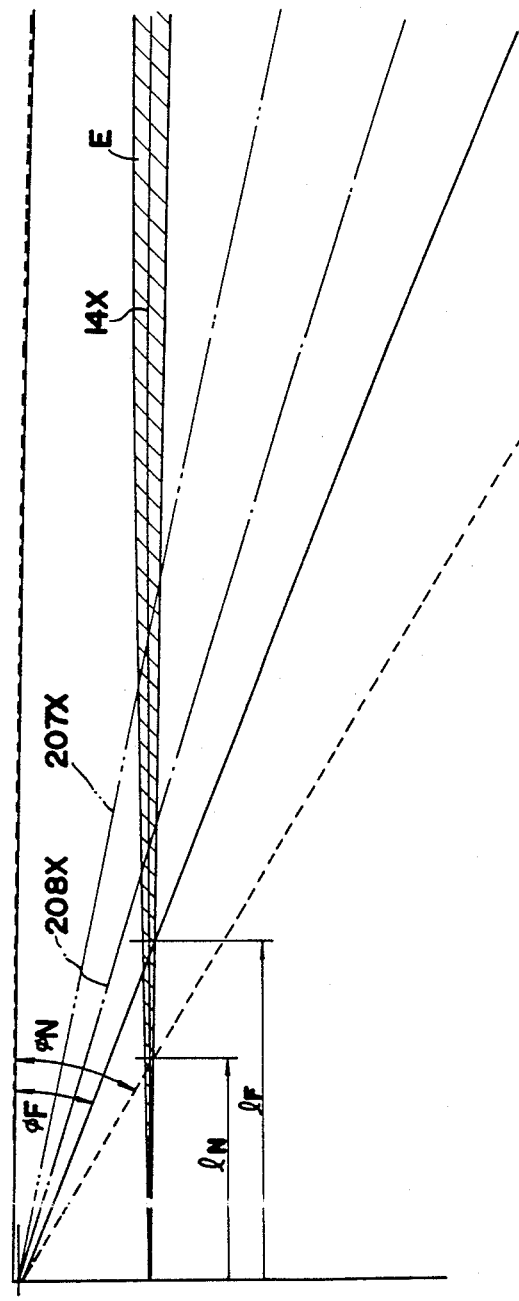
FIG. 27 is a side elevational view indicating positional relationship between the light fluxes projected by the first and second light projecting optical systems of FIG. 26 and the focus detection area.

FIG. 27 is a schematic view showing a positional relationship between the light fluxes and the focus detecting area E. In this figure, $\phi N$ represents the light flux emitted from the light source device 208 provided with the molded portion 208a having the spherical surface of radius $r_2$, and $\phi F$ represents the light flux emitted from the light source device 207 provided with the molded portion 207a having the spherical surface of radius $r_1$. As previously noted, since both spherical surfaces are coincident with each other at their lower ends, the light fluxes $\phi N$ and $\phi F$ are rendered coincident with each other at their upper ends. And since $r_2$ is larger than $r_1$, the spread of the light flux $\phi N$ is larger than that of the light flux $\phi F$. Therefore, the lower ends of both light fluxes $\phi N$ and $\phi F$ deviate from each other.

The light flux $\phi N$ illuminates a distance zone within the focus detection area E farther than lN, while the light flux lF illuminates a distance zone within the focus detection area E farther than lF which is longer than lN. Therefore, the distance zone within the focus detecting area E farther than lF is illuminated by both light fluxes $\phi N$ and $\phi F$, while the distance zone within the focus detecting area E from lN to lF is illuminated only by the light flux $\phi N$. Accordingly, an object located within the focus detection area at a relatively far position is illuminated by a light corresponding to the overlapping light fluxes $\phi N$ AND $\phi F$, while an object located within the focus detection area at a relatively close distance (from lN to lF) is illuminated by a weak light corresponding to the light flux $\phi N$ alone. Therefore, no matter in which position from short to long distance the object may be located, it can be illuminated by light having a sufficiently high intensity, thus permitting accurate focus detection.

Figure 28:
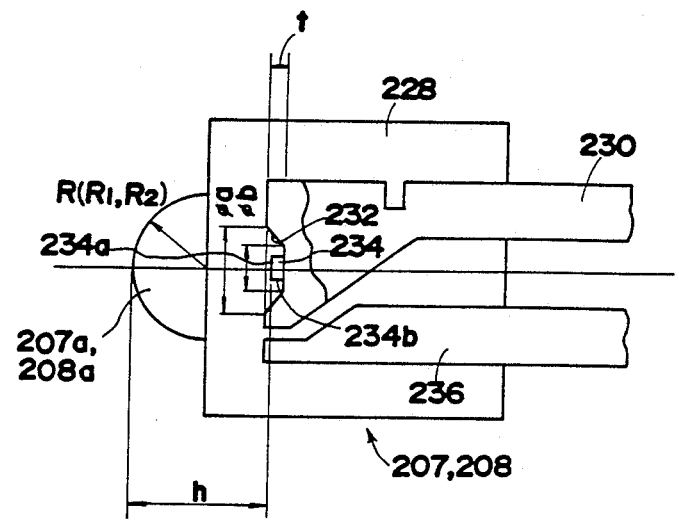
FIG. 28 is a cross-sectional view of the light source devices 207 and 208 of FIG. 26.
Figure 29:
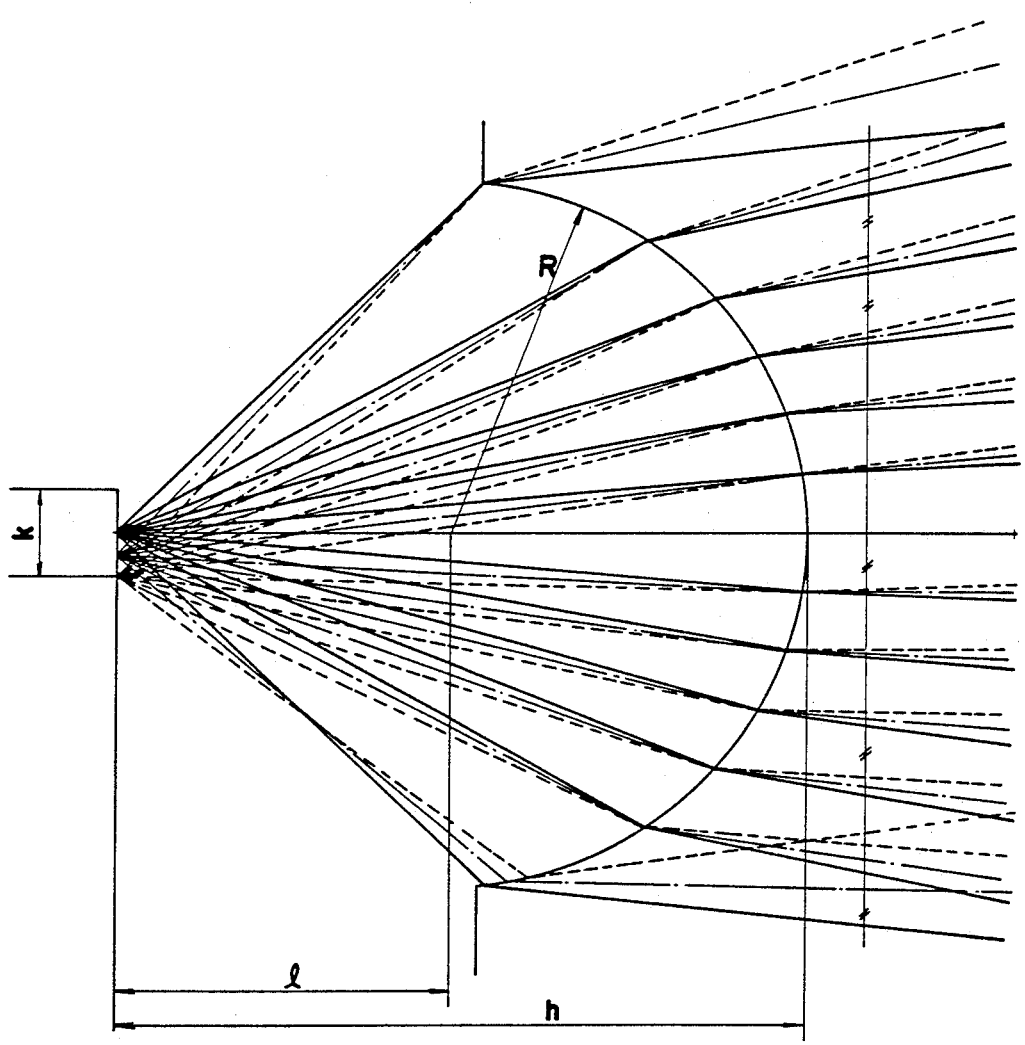
FIG. 29 is a schematic diagram illustrating pencils of light emitted from the front surface of the light emitting diode 234 as the light source of the light source devices 207 and 208.

Referring to FIG. 28 showing the construction of the light source devices 207 and 208, 228 denotes a unit member molded of a colorless transparent epoxy resin or the like. The unit member 228 is provided at its front with the light condensing portion 207a(208a). The radius of curvature of this spherical surface is assumed to be R ($r_1$, $r_2$). 230 denotes a first frame fixed to the unit member 228. At the front face of the first frame 230 is formed a conical recess 232 and on the inner surface of the recess 232 is vapor-deposited a material of a high reflectance such as gold or silver to enhance the reflectivity. With the first frame 230 fixed to the unit member 228, the recess 232 is located in a position of rotational symmetry relative to the optical axis of the spherical light condensing portion 207a (208a). Further, the recess 232 is in the form of a cone which diverges forward from the bottom. If the radius of the bottom is $\phi b$ and that of the inlet is $\phi a$, $\phi a$ is larger than $\phi b$.

To the bottom of the recess 232 is fixed a light emitting diode 234 so as to be positioned on the optical axis of the spherical light condensing portion 207a(208a). The light emitting diode 234 emits light from its front face 234a and side faces 234b. It is sticked to the bottom of the recess 232 with paste or the like and is electrically connected to the first frame 230. 236 denotes a second frame which is bonded to the unit member 228 and is electrically connected to the light emitting diode 234. The distance from the vertex of the portion 207a(208a) to the light emitting diode 234 is here assumed to be h as shown.

In such construction, not only the light (hereinafter referred to as "front-face light") emitted from the front face 234a of the light emitting diode 234 but also the light (hereinafter referred to as "side-face light") emitted from the side faces 234b of the same diode is projected forward thereby permitting an efficient illumination for an object within the focus detection area. Assuming that the size of the light emitting diode 234 and the quantities of the lights emitted therefrom are unchanged, the quantity of light projected toward an object varies depending on F number FNO of the projection lens, radius of curvature R of the portion 207a(208a), distance h from the portion 207a(208a) to the light emitting diode 234, angle of the slope of the recess 232 and the depth of the same recess. Therefore, these conditions will be considered below.

FIG. 27 shows a light flux which is emitted from the front face 234a of the light emitting diode 234 to be projected on an object. It is here assumed that R is 1.2 mm, h is 2.3 mm and the width k of the front face 234a of the light emitting diode 234 is 0.3 mm. l represents the distance from the front face 234a to the center of curvature of the spherical surface of the portion 207a(208a). $l=h-R$. F number FNO of the projection lens is assumed to be 1.2. Since the angle of the light incident on the spherical surface of the portion 207a(208a) and that of the light emanating from the spherical surface vary according to l, the light beam projected on the focus detecting object through the projection lens varies according to l. This is shown in the graph of FIG. 30.

Figure 30:
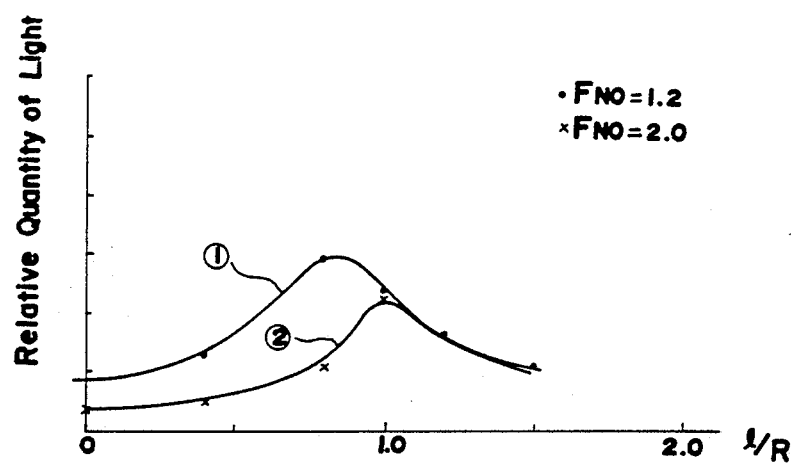
FIG. 30 is a graph illustrating relationship between change in the total quantity of the light projected by the projection lens and change in 1/R shown in FIG. 29.

In the graph of FIG. 30 showing relationship between change in the total quantity of light projected from the projection lens and change in l/R, a curve ① reflects the case of the projection lens of FNO=1.2 and a curve ② reflects the case of the projection lens of FNO=2.0. The curve ① indicates that, in the case of the projection lens of FNO=1.2, sufficient illumination is provided by the light emanating from the front surface 234a of the light emitting diode 234 if l/R is within the range of 0.6 to 1.1, preferably 0.8 to 0.9. On the other hand, the curve ② indicates that, in the case of the projection lens of FNO=2.0, sufficient illumination is provided by the light emanating from the front face 234a of the light emitting diode 234 if l/R is within the range of 0.8 to 1.3, preferably 1.0 or thereabouts. Thus, once FNO is given, an l/R value providing good illumination efficiency is determined, and l can be determined once R is determined according to the width of the projected light flux ($\phi N$, $\phi F$ in FIG. 27).

Figure 31:
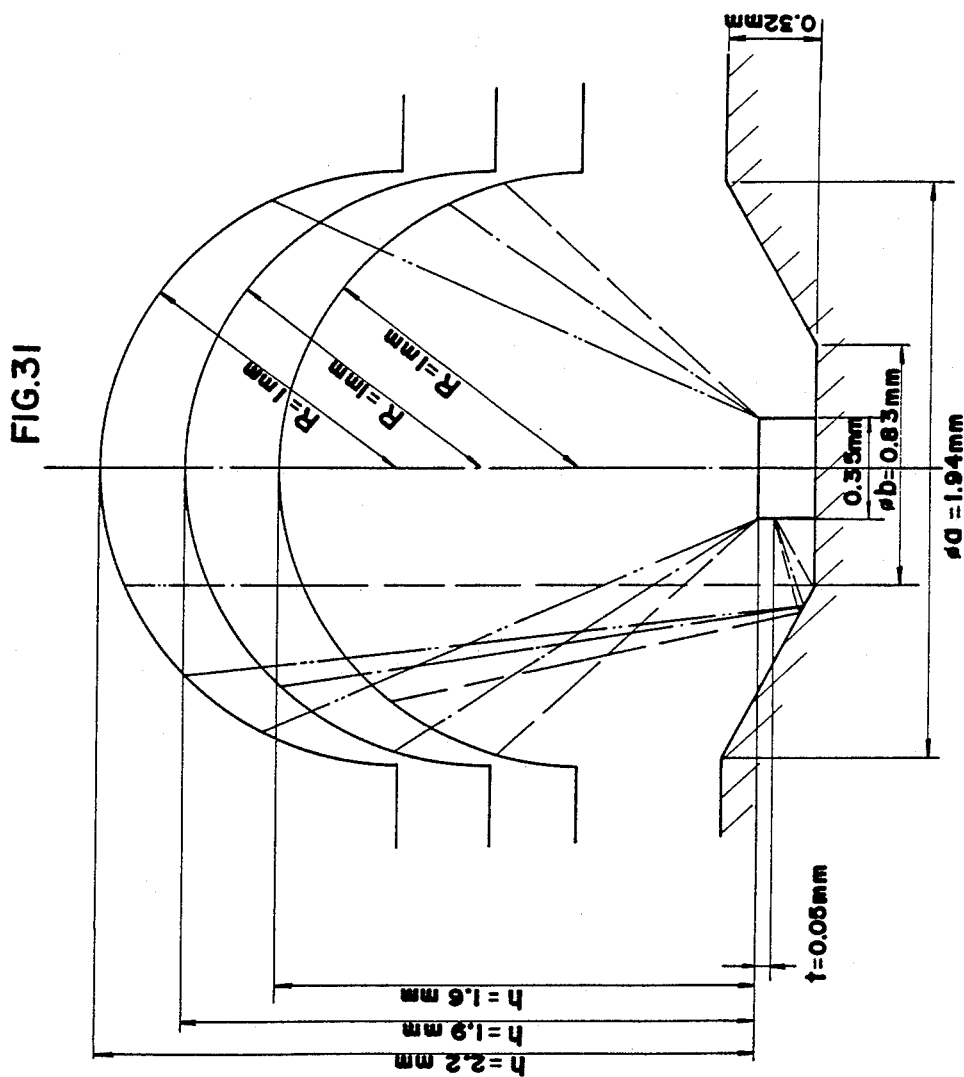
FIGS. 31 to 35 are schematic diagrams illustrating pencils of light emitted from the side surfaces of the light emitting diode 234, wherein the light reflective surface of the light reflecting member 232 of FIG. 28 has an angle of inclination of 30° in FIG. 31, 35° in FIG. 32, 44° in FIG. 33, 55° in FIG. 34 and 65° in FIG. 35, respectively.

FIGS. 31 to 35 show how the light flux emitted from the side faces 234b of the light emitting diode 234 to be projected on an object changes with change in the angle of the inclination of the recess 232. In these figures there are shown light fluxes in the three cases of the distance h being 2.2 mm, 1.9 mm and 1.6 mm (i.e. l=1.2 mm, 0.9 mm and 0.6 mm) and the radius of curvature R of the spherical surface of the lens portion 207a (208a) being 1 mm. In these figures, moreover, the two dotted chain lines represent pencils of light in the case of h=2.2 mm, the one dotted chain lines represent pencils of light in the case of h=1/9 mm and the dotted lines represent pencils of light in the case of h=1.6 mm. FIG. 31 shows the case where the angle $\alpha$ of the inclination of the recess 232 is 30°, $\phi a = 1.94$ mm, $\phi b = 0.83$ mm, $K = 0.35$ mm, the depth of the recess is 0.32 mm, the distance t from the upper face 234a of the light emitting diode 234 to the side-face light emitting position is 0.05 mm, and $F_{NO}$ of the projection lens is 1.2.

Figure 32:
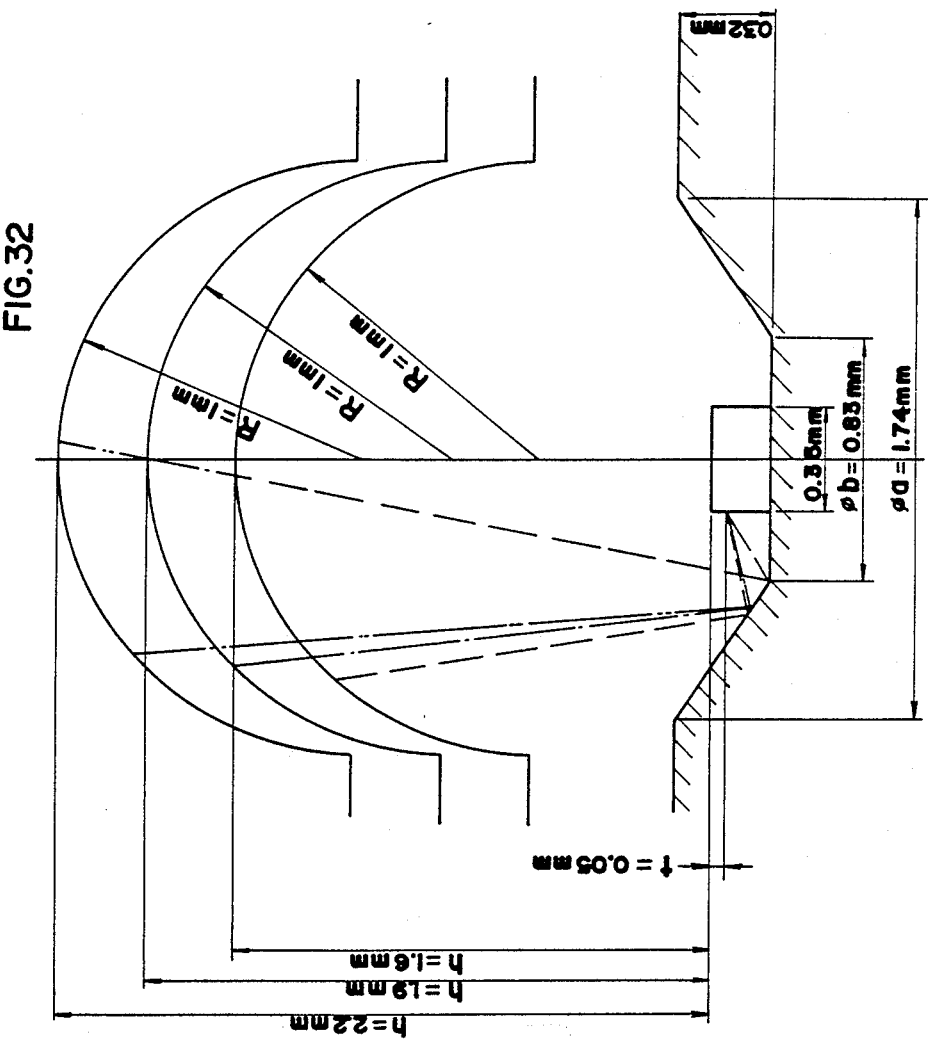
Figure 33:
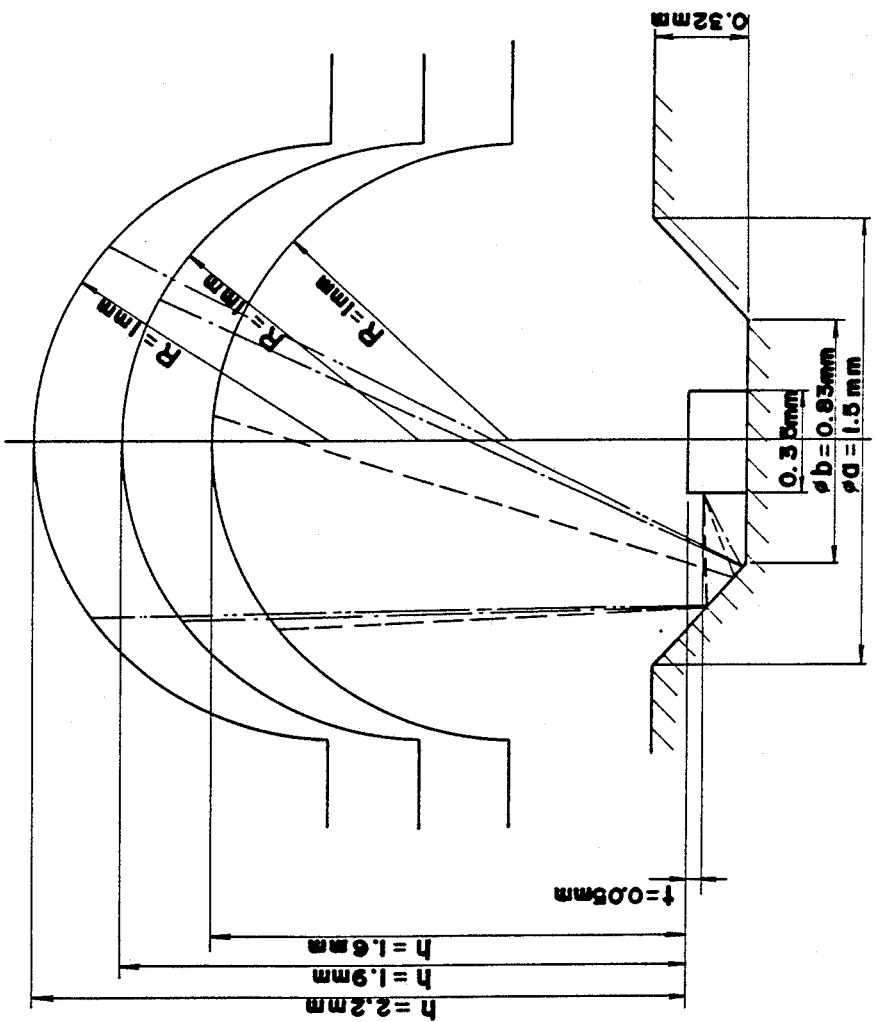
Figure 34:
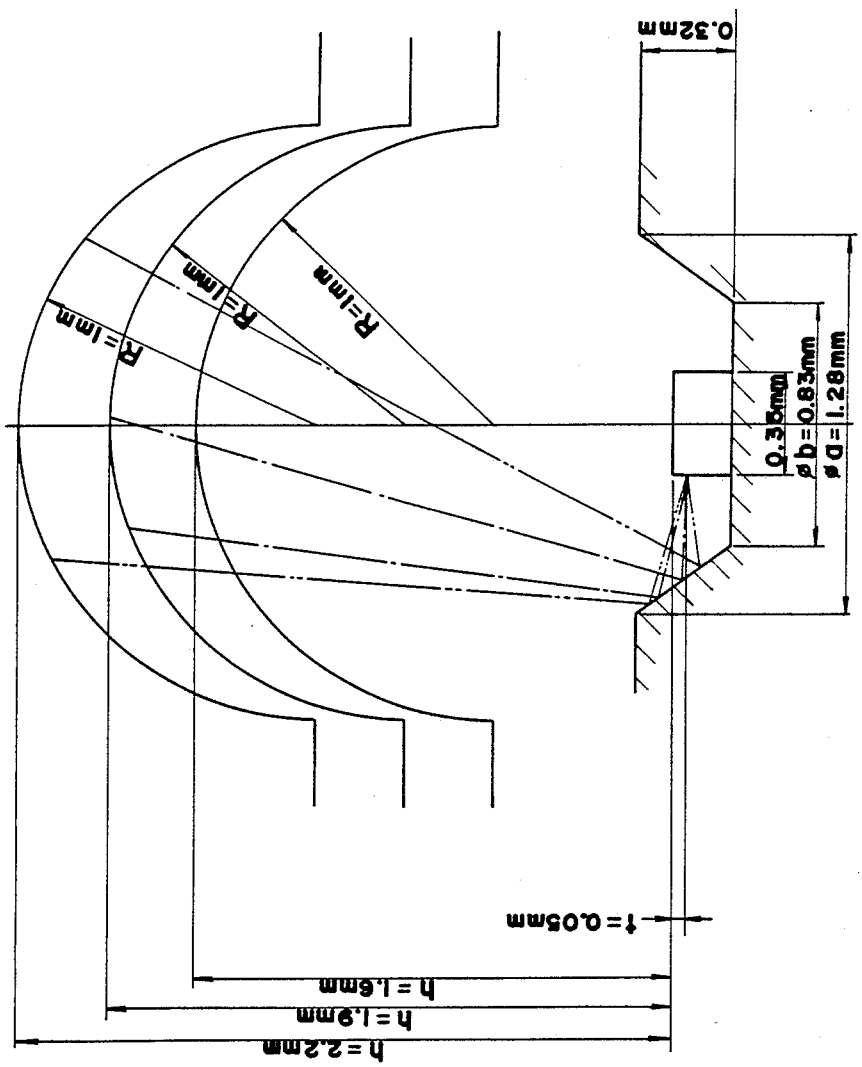
Figure 35:
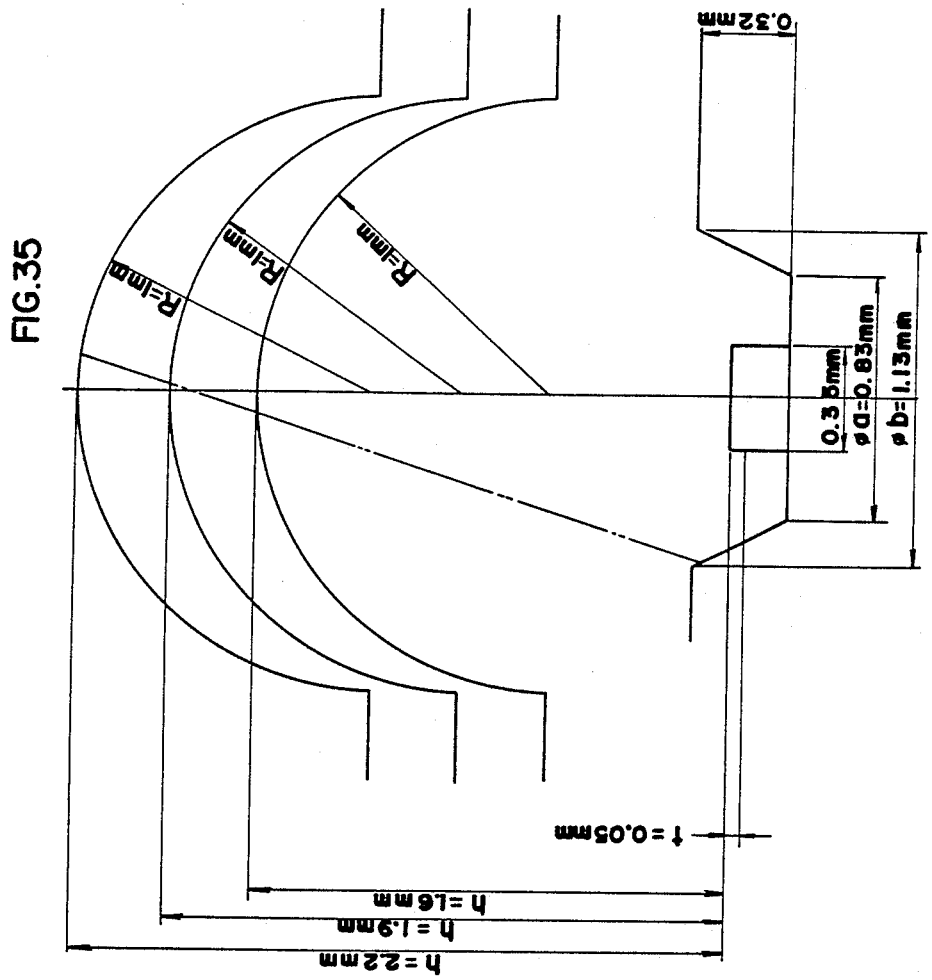

In FIG. 32 $\alpha = 35°$ and $\phi a = 1.74$ mm; in FIG. 33 $\alpha = 44°$ and $\phi a = 1.5$ mm; in FIG. 34 $\alpha = 55°$ and $\phi a = 1.28$ mm; and in FIG. 35 $\alpha = 65°$ and $\phi a = 1.13$ mm. In all of FIGS. 32 to 35 the depth of the recess is 0.32 mm. If h=1.6 mm (l=0.6 mm) in FIG. 34 wherein $\alpha = 55°$, there is no side-face light projected towards an object through the projection lens, and in the two cases of h=1.6 mm (l=0.6 mm) and h=1.9 mm (l=0.9 mm) in FIG. 35 wherein $\alpha = 65°$, there is no side-face light projected towards an object through the projection lens. Thus, in these cases the light emitted from the side face of the light emitting diode 234 cannot be used at all for lighting an object within the focus detection area, that is, the lighting efficiency is poor.

Figure 36:
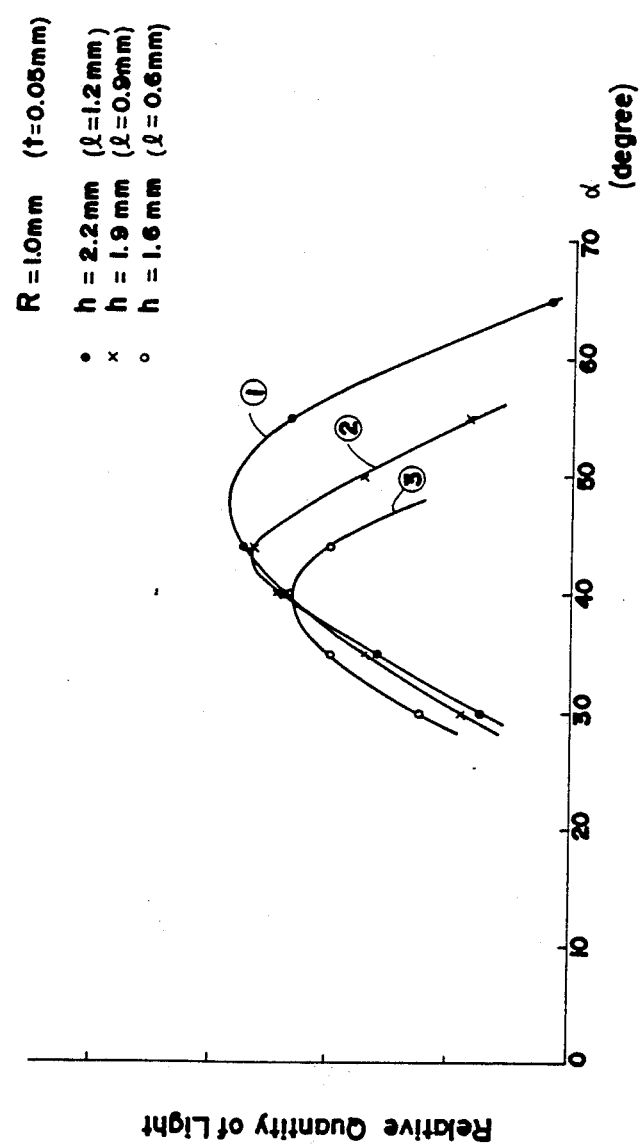
FIGS. 36 and 37 are graphs illustrating relationship between change in the total quantity of the light projected by the projection lens and change in the angle of inclination of the light reflective surface of the concave light reflecting member 232 of FIG. 28, in the case of the projection lens of F No.=1.2 and F No.=1.7, respectively.

The relationship between change in the angle $\alpha$ of the inclination of the recess 232 and change in the quantity of light emitted from the side faces of the light emitting diode 234 for illumination of an object is summarized graphically in FIG. 36. FIG. 36 shows how the quantity of light emitted from the side faces (the position of t=0.05 mm) of the light emitting diode 234 to be used for illumination through the projection lens changes with change in the angle $\alpha$, in terms of calculated values with respect to the cases of h=2.2 mm (l=1.2 mm) (curve ①), h=1.9 mm (l=0.9 mm) (curve ②) and h=1.6 mm (l=0.6 mm) (curve ③), assuming R=1.0 mm and FNO=1.2. In the case of the projection lens of FNO=1.2, it is when l/R is within the range of 0.8 to 0.9 as shown in FIG. 30 that the light emitted from the front face 234a of the light emitting diode 234 can be used for illumination efficiently. In addition, it is seen that in the case of l=0.9 mm, the lighting efficiency of the side-face light is high when $\alpha$ is in the range of 40° to 45°. Thus, in the case of the projection lens of FNO=1.2, l/R and $\alpha$ should be in the ranges of 0.8 to 0.9 and 40° to 45° respectively in order that both front and side-face light fluxes can illuminate an object within the focus detection area efficiently.

Figure 37:
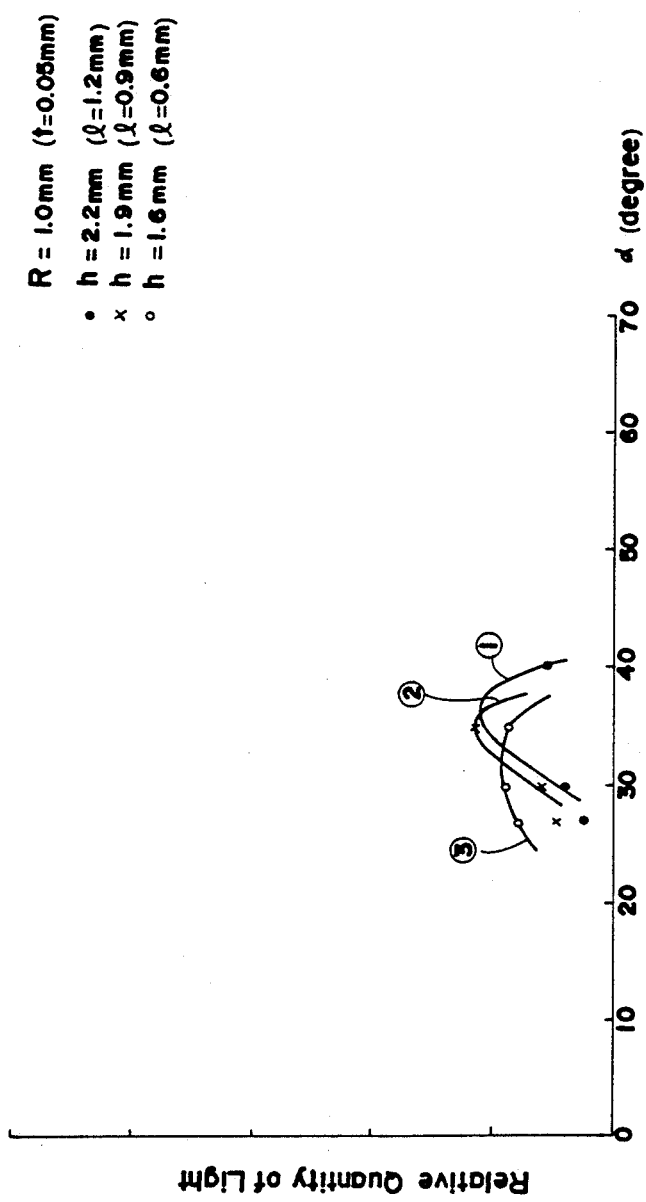

FIG. 37 shows how the quantity of light emitted from the side faces (the position of t=0.05 mm) of the light emitting diode 234 changes with change in the angle $\alpha$, in terms of calculated values with respect to the cases of h=2.2 mm (l=1,2 mm) (curve ①, h=1.9 mm (l=0.9 mm) (curve ②) and h=1.6 mm (l=0.6 mm) (curve ③), assuming R=1.0 mm and FNO=1.7. From FIG. 37 it is seen that in the case of the projection lens of FNO=1.7, the lighting using the side-face light is most efficient at a value of $\alpha = 35°$ or thereabouts. FIGS. 36 and 37 are drawn on the same scale. From these figures, it is seen that with increase of FNO, the decrease in quantity of the side-face light is large as compared with that of the front-face light. It is also seen from these figures that with decrease of h (i.e.l), the angle $\alpha$ of the recess 232 providing the most efficient lighting by the side-face light becomes smaller.

Figure 38:
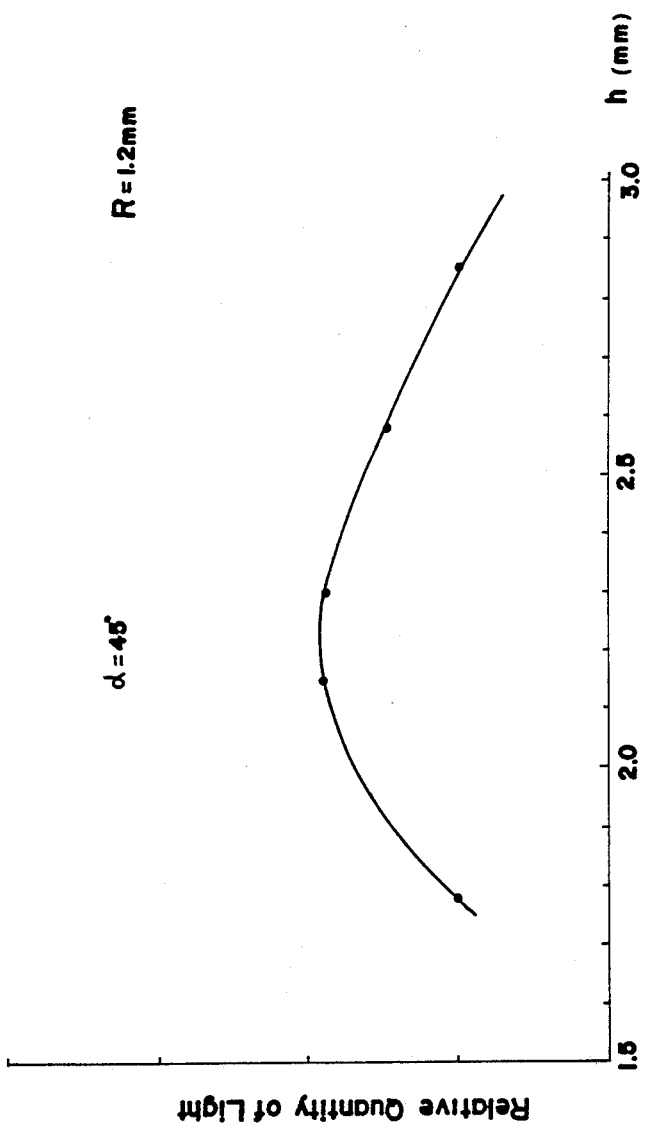
FIG. 38 is a graph illustrating relationship between change in the total quantity of the light projected by the projection lens and change in the distance from the vertex of the spherical molded portion 207a or 208a to the light emitting diode.

FIG. 38 is a graph showing the results of actual measurement of change in the light quantity of all light fluxes projected from the projection lens to be used for illumination, due to changes in the distance h, in the case of R=1.2 mm, FNO=1.2 and $\alpha = 45°$. From FIG. 38 it is seen that the maximum light quantity for illumination is obtained in the vicinity of h=2.2–2.3 (i.e. l=1.2–1.3 mm). Since R=1.2 mm, l/R becomes 0.8 to 0.9 and this well coincides with the foregoing conclusion based on calculation. That is, it is seen from FIG. 38 that the value of h for obtaining a good lighting efficiency is in the range of 1.9 to 2.5 mm, and also actually it has thus been confirmed that the range of l/R=0.6 to 1.1 is desirable for R=1.2 mm in the case of the projection lens of FNO=1.2.

Figure 39A:
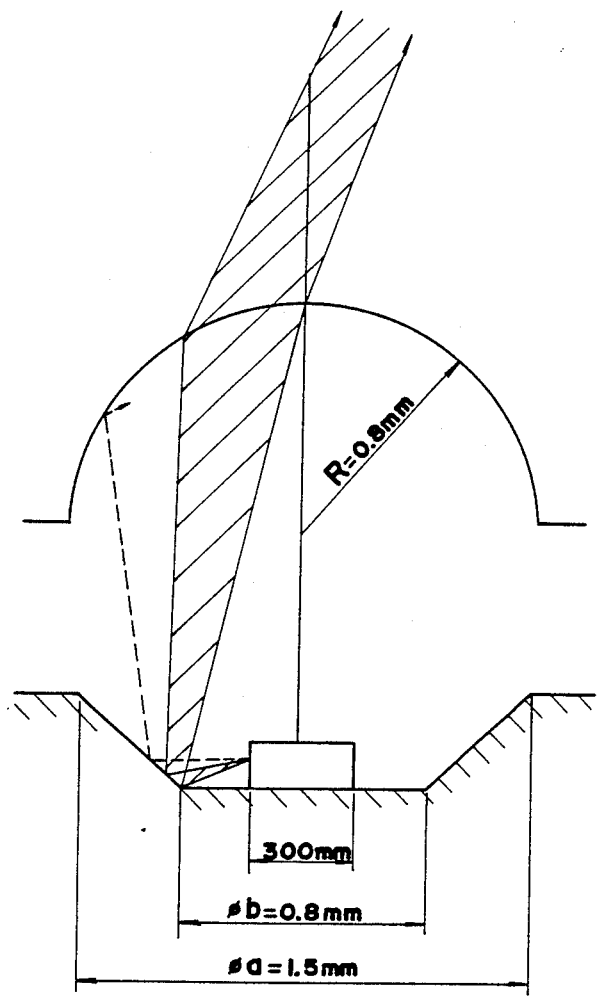
FIGS. 39A and 39B are schematic diagrams illustrating the width of the light flux emitted from the side surfaces of the light emitting diode 234 in the case of the spherical molded portion 207a or 208A having radius of curvature R=0.8 mm and R=1.0 mm, respectively.
Figure 39B:
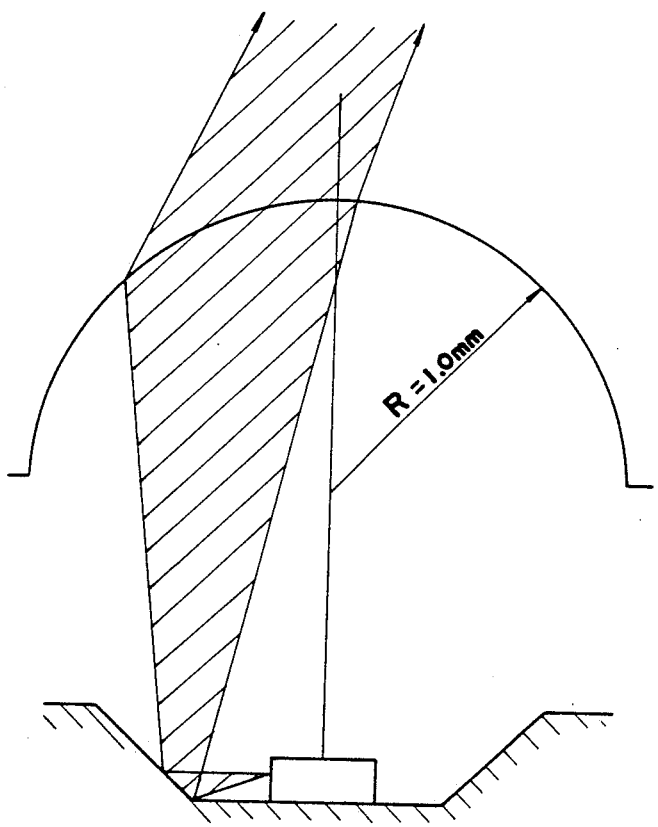

FIGS. 39A and 39B illustrate change in the width of the side-face light flux incident on the projection lens (FNO=1.2) due to change in the radius of curvature R of the spherical surface in the case of $\alpha$ (=45°). In FIG. 39A R=0.8 mm and in FIG. 39B R=1.0 mm but l/R is kept unchanged in FIGS. 39A and 39B. The front-face light flux does not change with change in R. From a comparison between FIGS. 39A and 39B it is seen that as R becomes smaller, the side-face light flux incident on the projection lens becomes narrower and its quantity decreases. That is, as R is made smaller while maintaining l/R constant, the quantity of illumination light based on the side-face light flux decreases gradually. However, where the focal length of the projection lens is kept unchanged, the smaller the R, the smaller becomes the width of the light flux (corresponding to the foregoing $\phi N$ or $\phi F$) projected toward an object within the focus detection area, and therefore the luminosity over the object rather increases.

Figure 40:
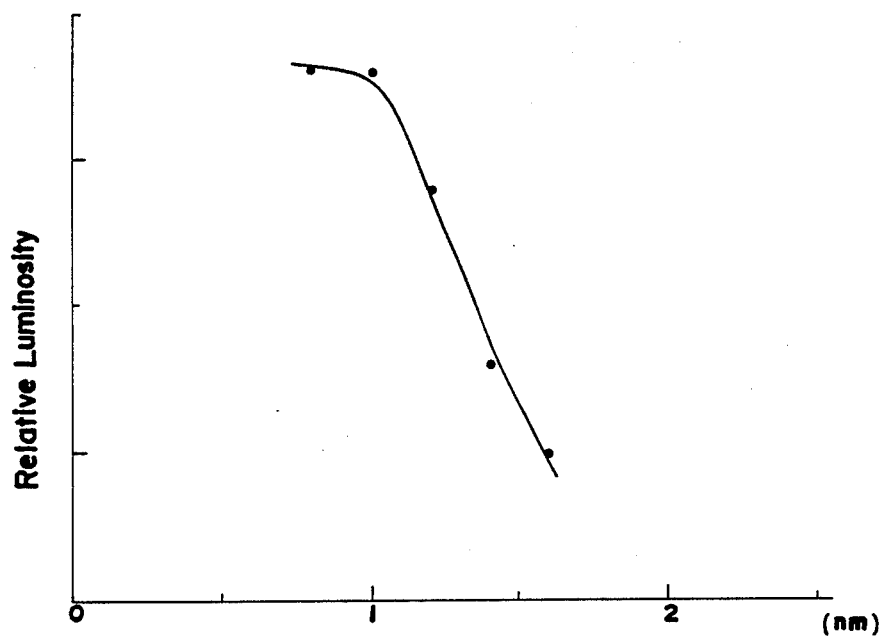
FIG. 40 is a graph illustrating change in relative luminosity within the focus detection area due to change in the radius of curvature R of the spherical molded portion.

FIG. 40 shows change in luminosity over an object within the focus detection area relative to change in R (unit: mm) under the conditions of FNO=1.2 and $\alpha = 45°$ and at l/R=0.9 (h=0.9 R). From FIG. 40 it is seen that the relative luminosity over the object increases with decrease of R, but when R becomes smaller than 1.0 mm, the increase of the relative luminosity is discontinued due to decrease of the side-face light flux itself. Therefore, in order to use the side-face light flux efficiently for illumination, a value of R of 1.0 mm or thereabouts is most desirable. In the embodiment illustrated in FIG. 26, therefore, the l/R value is made common between the two light source devices 207 and 208 and the radius of curvature $r_1$ of the spherical surface of the molded portion 207a of the light source device 207 is made smaller than the radius of curvature $r_2$ of the spherical surface of the molded portion 208a of the light source device 208 while $r_1$ is set near 1.0 mm. Therefore, since $r_2$ is larger than $r_1$, $r_2$ is larger than 1.0 mm. In such a construction, the luminosity over an object based on the light flux $\phi F$ is higher than that based on the light flux $\phi N$. This makes it possible to give a higher luminosity to an object lying at a long distance side within the focus detection area than to an object lying at a short distance side within the focus detection area.

FIGS. 41 to 49 relate to further embodiments of the present invention in which a projective pattern is formed integrally with a spherical transparent molded portion of a light source device.

Figure 41:
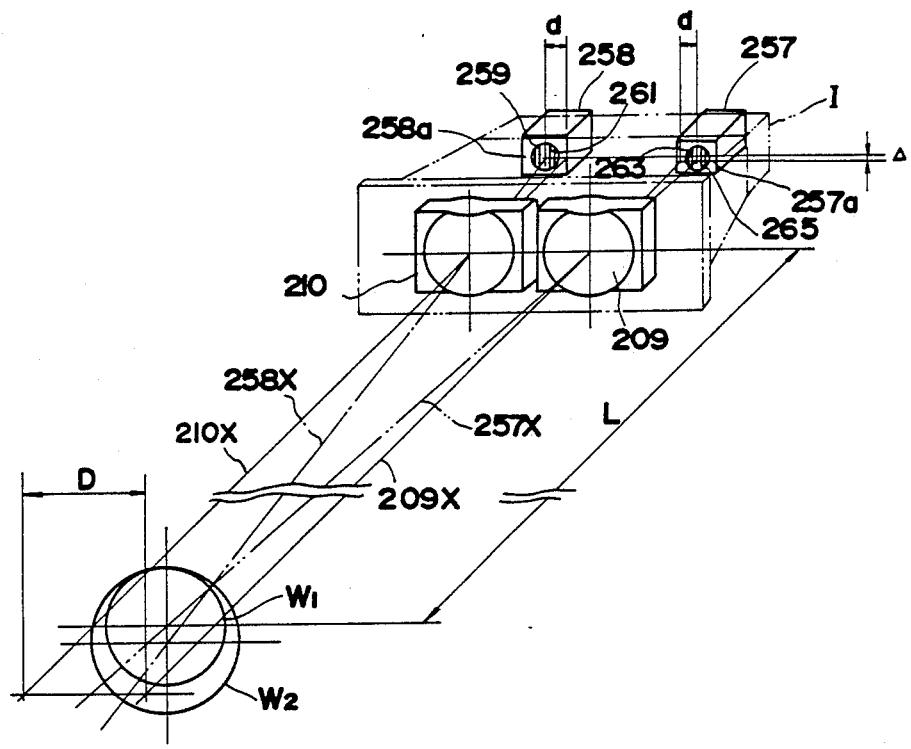
FIG. 41 is a perspective view of first and second light projecting optical systems of a lighting device according to a fifth embodiment of the present invention.

Referring to FIG. 41 showing first and second light projecting optical systems of a lighting device according to a fifth embodiment of the present invention, 209 and 210 represent projection lenses of the same shape, which are disposed in the same manner as in FIG. 26. 257 and 258 designate light source devices disposed behind the projection lenses 209 and 210 so that their optical axes 257X and 258X intersect each other at a position spaced by a distance L from the projection lenses 209 and 210. More specifically, the light source devices 257 and 258 are provided at their front faces with transparent molded portions 257a and 258a each having a spherical surface. The centers of the spherical surfaces are spaced by a distance d in directions opposite to each other relative to the optical axes 209X and 210X of the projection lenses 209 and 210. The radii of curvature of the spherical surfaces of the mold portions 257a and 258a are $r_1$ and $r_2$, respectively, and $r_2$ is larger than $r_1$. In the vertical direction in the figure (direction perpendicular to the projection lens optical axes 209X and 210X), the centers of both spherical surfaces are deviated from each other by the difference $\Delta(=r_2-r_1)$ of the radii of curvature so that lower ends of both spherical surfaces coincide with each other. Thus, the configurations of the portions 257a and 258a so far explained are the same as those of the portions 207a and 208a of the fourth embodiment shown in FIG. 26. As shown in FIG. 41, at the front faces of the portions 257a and 258a are formed a pair of very small convex portions 263 and 265 and a pair of like convex portions 259 and 261 respectively. The convex portions 263 and 265 are symmetrical with respect to a vertical plane including the optical axis 209X while the convex portions 259 and 261 are symmetrical with respect to a vertical plane including the optical axis 210X.

Figure 42:
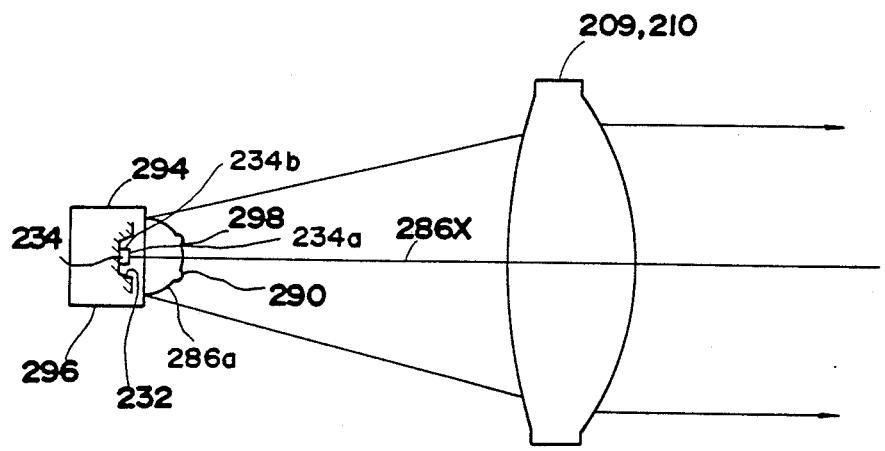
FIG. 42 is a side elevational view of one of the first and second light projecting optical systems of FIG. 41.

FIG. 42 shows the construction of the light source devices 257 and 258 more specifically. In this figure, 294 indicates a light source device corresponding to 257 and 258, and 296 denotes a unit member molded of a colorless transparent epoxy resin or the like. At the front portion of the unit member 296 is formed a light condensing portion 286a which has a spherical surface corresponding to the molded portions 257a and 258a. On this spherical surface are integrally formed a pair of contrast pattern projecting convex portions 290 and 298 which are symmetrical with respect to a vertical plane including the optical axis of the light source device. The convex portions 290 and 298 correspond to the convex portions 290 and 265 and the convex oprtions 259 and 261 shown in FIG. 41. In the interior of the unit member 296 is fixed a frame (not shown), whose front face is formed with a conical recess 232. On the inner surface of the recess 232 is vapor-deposited a material of a high reflectance such as gold or silver to enhance the reflectivity with this frame fixed to the unit member 296, the recess 232 is located in a position of rotational symmetry relative to the optical axis 286x of the light condensing portion 286a. Further, the recess 232 is in the form of a cone which diverges forward from the bottom.

To the bottom of the recess 232 is fixed a light emitting diode 234 so as to be positioned on the optical axis 286x of the light condensing portion 286a. The light emitting diode 234 emits light from its front face 234a and side faces 234b and it is sticked to the bottom of the recess 232 with paste or the like.

Figure 43:
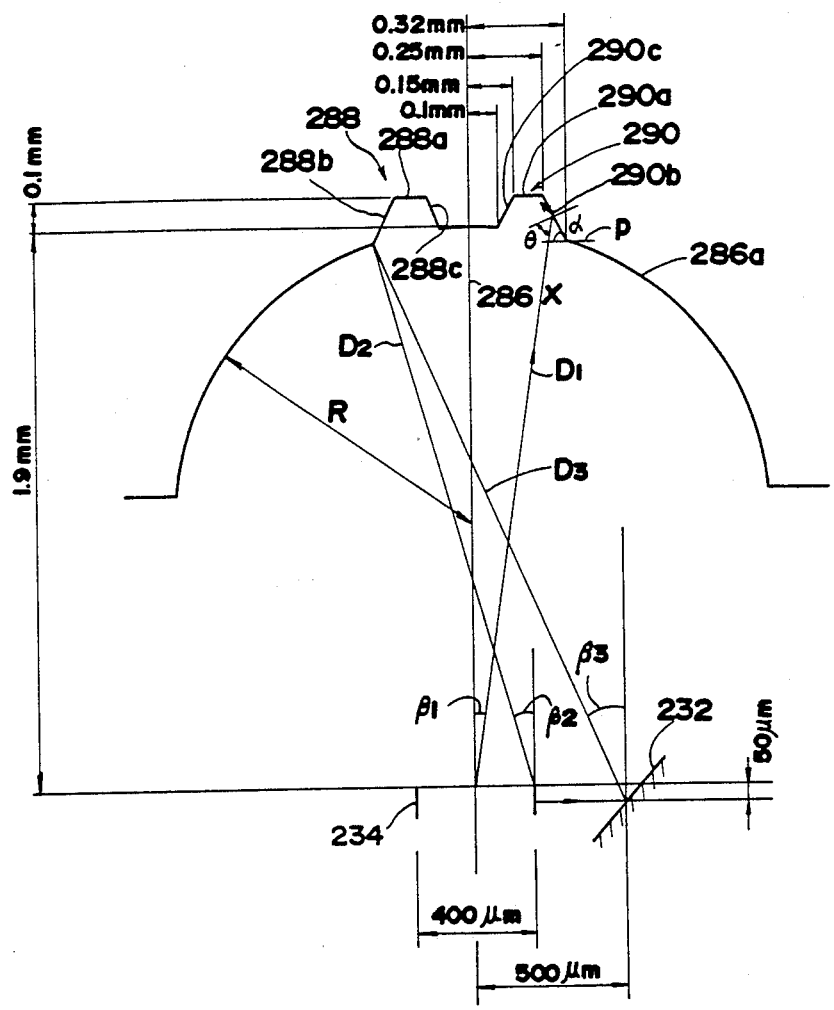
FIG. 43 is an enlarged schematic diagram of essential parts of the light source device of FIG. 42.

Referring to FIG. 43, on the surface of the portion 286a facing the projection lens 209 (210) are formed convex portions 288 and 290 of a shape as shown. The convex portions 288 and 290 are symmetrical with each other relative to a plane perpendicular to the paper surface and inclusive of the optical axis 286X and are in an elongated shape in a direction perpendicular to the paper surface. Further, the direction of the width of the convex portions 288 and 290 (transverse direction in the figure) is coincident with the extending direction of the light sensing elements of the image sensing device 24 disposed within the focus detecting device F of the camera. The convex portions 288 and 290 are composed of planar light transmitting portions 288a and 290a and inclined total reflection portions 288b, 288c, 290b and 290c. From the front surface and the side faces of the light emitting diode 234 are emitted fluxes of light of a wave length determined by the material of the light emitting diode.

$D_1$ represents a typical pencil of light radiated from one point of the optical axis 286X at the front surface of the light emitting diode 234. If the angle of the pencil of light $D_1$ relative to the optical axis 286X is $\beta_1$ and the angle of incidence of the pencil of light $D_1$ relative to the total reflection portion 290b is $\theta$, the angle $\alpha$ of the total reflection portion 290b from a line P perpendicular to the optical axis 286X is represented as follows:

$$\alpha = \theta + \beta_1$$

The condition for total reflection of the pencil of light $D_1$ at the total reflection portion 290b is as follows provided the sizes of various portions are as shown in FIG. 43 and a refractive index N' of the transparent resin forming the portion 286a is 1.5:

$$\theta \geq 42°$$

On the other hand, $D_2$ represents a pencil of light which is emitted from an end of the front aace of the light emitting diode 234 and is incident on the lower end of the total reflection portion 288b of the convex portion 288. The pencil of light $D_2$ forms an angle $\beta_2$ relative to an axis parallel to the optical axis 286A. Among the lights emanating from the front surface of the light emitting diode 234, the pencil of light $D_2$ is incident on the total reflection portion 288b at the smallest angle of incidence. $D_3$ represents a pencil of light which is radiated from a side face of the light emitting diode 234, and reflected at the side surface of the recess 232 to impinge on the lower end of the total reflection portion 288b of the convex portion 288. This pencil of light $D_3$ forms an angle $\beta_3$ relative to an axis parallel to the optical axis 286X In this case, among the lights emanating from the side face of the light emitting diode 234 and reflected at the side surface of the recess 232. the pencil of light $D_3$ is incident on the total reflection portion 288b at the smallest angle of incidence. As is apparent from the figure, there exists the following relationship.

$$\beta_3 > \beta_2 > \beta_1$$

Accordingly, if the angle of the total reflection portions 288b and 290b is set to a value causing total reflection of the pencil of light $D_3$, there will occur total reflection of all the other pencils of light mentioned above, so that no light emanates from the total reflection portion. Thus, this portion observed through the projection lens appears as a dark line, that is, a contrast pattern is projected towards the focus detection area.

As an example, the condition for the total reflection is calculated as follows:

$\beta_3 = 23.5°$ and $\alpha \geq 42° + 23.5° = 65.5°$

Here it is assumed that the width of the chip of the light emitting diode 234 in a direction perpendicular to the optical axis 286X is 400 μm, the distance from the optical axis 286X to the reflective portion of the recess 232 is 500 μm, the distance from the front surface of the light emitting diode 234 to the vertex of the portion 286a is 1.9 mm, the radius of curvature R of the spherical surface of the portion 286a is 1 mm, and dimensions of the convex portions 288 and 290 are as shown in FIG. 6.

Figure 44:
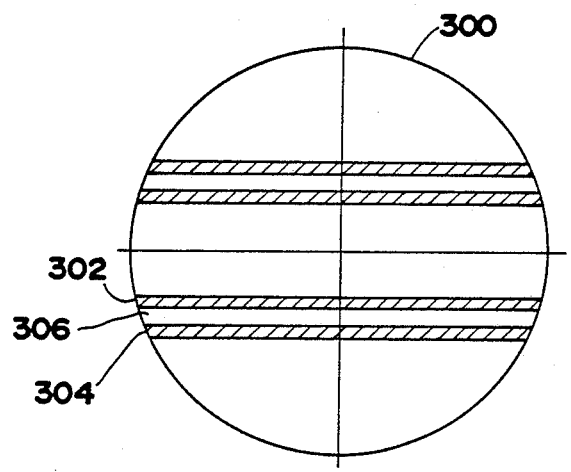
FIG. 44 is a schematic diagram of a projective pattern image formed by the light source device of FIG. 42.

FIG. 44 shows a projective pattern image formed by the light source device of FIG. 43. 300 represents an extent of the entire projected image, in which dark lines 302 and 304 are formed at portions corresponding to the total reflection portions 288b, 288c, 290b and 290c of the convex portions 288 and 290 formed on the front face of the portion 286a. Bright portions 306 corresponding to the light transmitting portions 288a and 290a are located between those dark portions 302 and 304.

Figure 45:
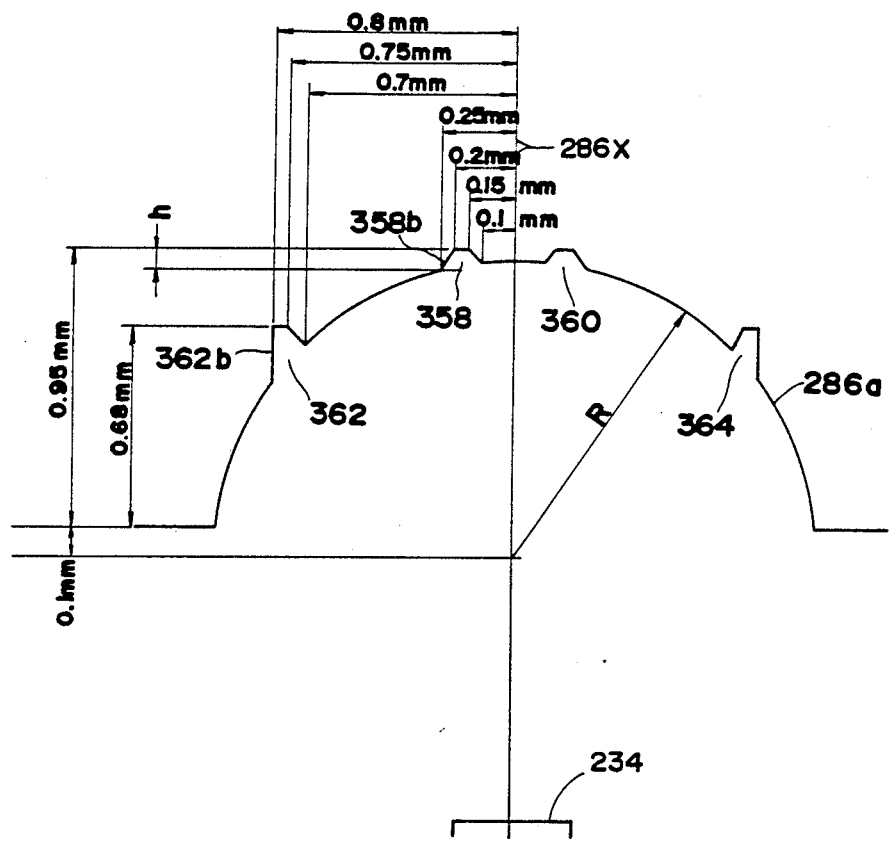
FIGS. 45 and 46 are enlarged schematic diagrams of essential parts of first and second modifications of the light source device of FIG. 42, respectively.

FIG. 45 shows a first modification of the light source device of FIG. 43, which includes a larger number of convex portions for increasing the number of dark lines. In this modification, four convex portions 358, 360, 362 and 364 are formed symmetrically with respect to a plane perpendicular to the paper surface and inclusive of the optical axis 286X. The convex portions 358 and 362 are formed with total reflection portions 358b and 362b respectively so that the total reflection portion 362b is closer to parallelism to the optical axis 286X. This is based on the foregoing condition for total reflection. On the other hand, the angle (corresponding to $\alpha$) and height (indicated at h in the figure) of the total reflection portions determine the width of dark lines of the projected image and so may be designed as necessary. Dimensions of various portions in this modification are as shown in the figure.

Figure 46:
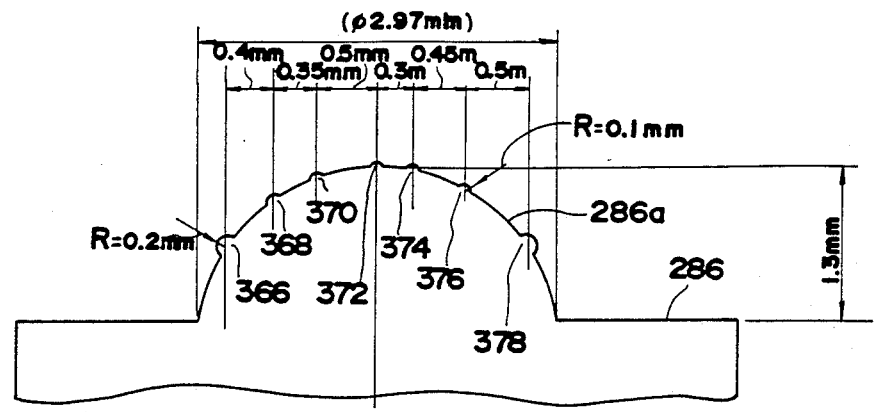
Figure 47:
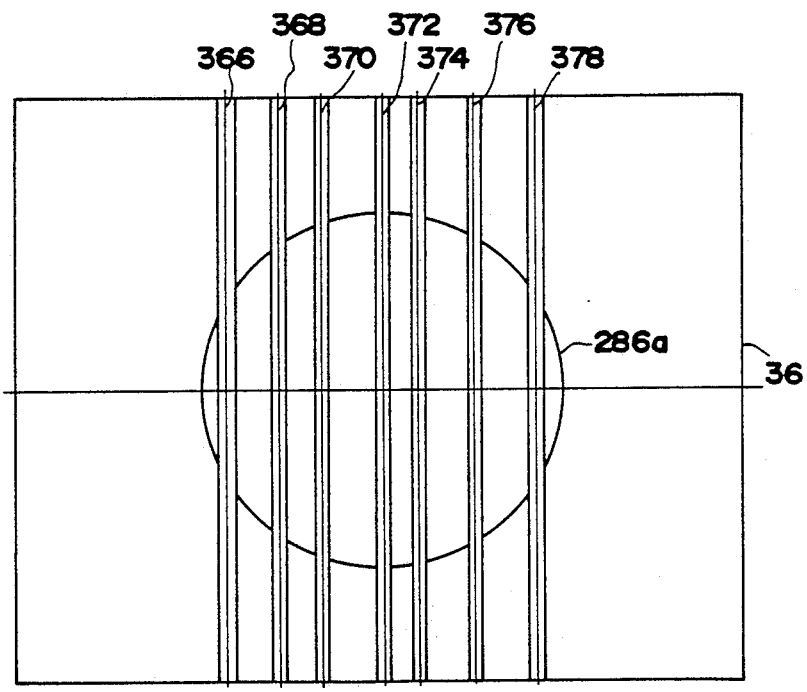
FIG. 47 is a front view of the light source device according to the second modification of FIG. 46.

FIGS. 46 and 47 show a second modification of the light source device of FIG. 43. In this figure, 366 to 378 represent a plurality of convex portions which are formed in a semicircular section along the surface of the portion 286a. Total reflection occurs in the vicinity of the portion where each such semicircle intersects the surface of the portion 286a.

Figure 48:
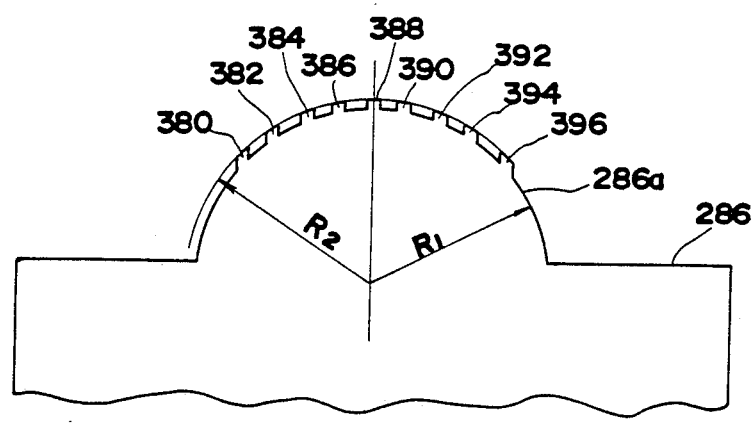
FIG. 48 is an enlarged schematic diagram of essential parts of a third modification of the light source device of FIG. 42.
Figure 49:
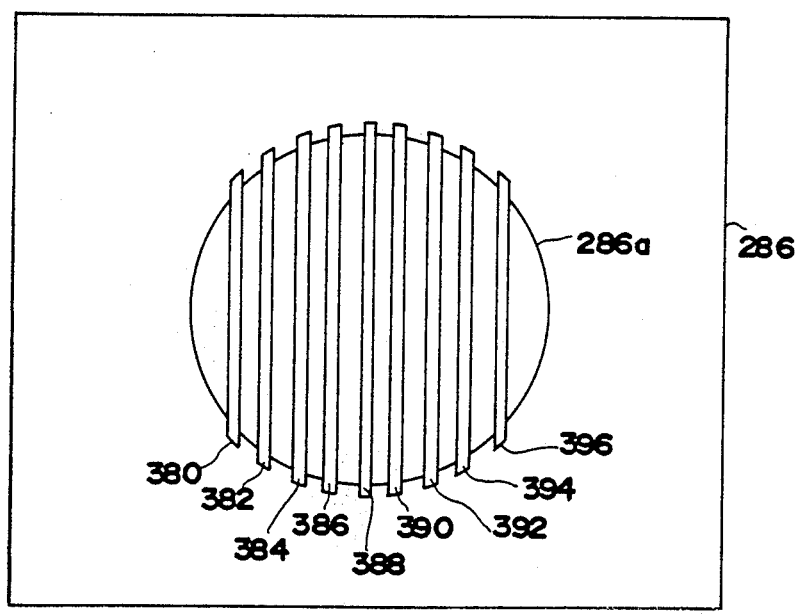
FIG. 49 is a front view of the light source device according to the third modification of FIG. 48.

FIGS. 48 and 49 show a third modification of the light source device of FIG. 43, in which the angle $\alpha$ of each of projections 380 to 396 is set at 90°, so that a number of fine dark lines are formed on the projective pattern image. The fore end face (light emitting portion) of each of the projections 380 to 396 is in contact with a circle of radius $R_2$ which is larger than the radius of curvature $R_1$ of the portion 286a. In this case, the width of each projection in a direction perpendicular to the optical axis 286X is preferably in the range of 0.1 to 0.2 mm. Such a very small projection can be easily obtained by forming its mold under the technique of electrical discharge machining.

Although in the fifth embodiment and the first to third modifications thereof, the spherical light condensing portion 286a is integrally formed with the projections or convex portions for the projection of a contrast projective pattern image, recesses or concave portions may be formed in the portion 286a instead of the projections or convex portions. Further, the contrast projective pattern image to be projected on the focus detection area may be determined according to characteristics of the focus detecting device and is not necessarily limited to those of the fifth embodiment and the first to third modifications thereof, constituted by bright and dark stripes.

Figures 50A, 50B, 50C:
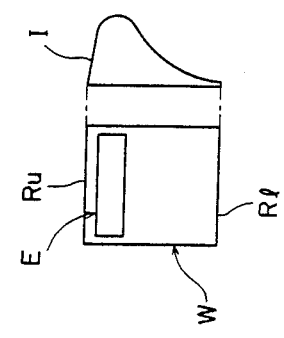
FIGS. 50A, 50B and 50C schematically illustrate overlapping conditions of a light flux projected by a light projecting optical system at the distance $L_{MIN}$, L and $L_{MAX}$ shown in FIG. 51 and the focus detection area, respectively.
Figure 51:
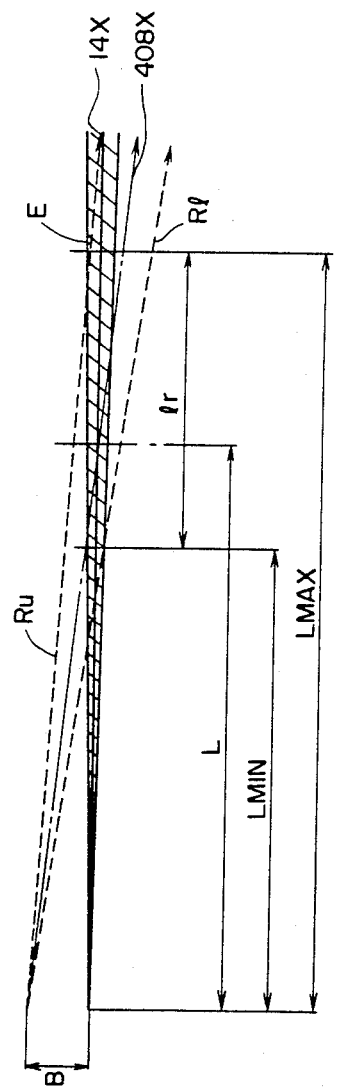
FIG. 51 is a side elevational view indicating positional relationship between the light flux projected by a light projecting optical system and the focus detection area, wherein B represents separation of a light source included in the light projecting optical system from the optical axis 14X of the objective lens.

Shown in FIGS. 52 to 67 are still further embodiments of the present invention in which a single light projecting optical system is used for lighting a comparatively wide distance range within the focus detection area. In advance to explanation of these embodiments, explanation is given of FIGS. 50A, 50B and 50C and 51. In FIG. 51, a light projecting optical system is provided just above the optical axis 14X of the objective lens although it is not shown, and B represents a separation of a light source included in the light projecting optical system from the optical axis 14X. The projection optical axis 408X of the light projecting optical system intersects the optical axis 14X of the objective lens at a distance L from the focus detection surface of the focus detection device F of the camera. $R_u$ and $R_l$ respectively represent the uppermost and lowermost pencils of light of the light flux projected by the light projecting optical system and $L_{MAX}$ and $L_{MIN}$ respectively represent the longest and shortest distance where the flux of light projected by the light projecting optical system can cover the focus detection area E. Thus, the focus detection area within the distance range $l_r$ from $L_{MAX}$ to $L_{MIN}$ is illuminated by the light flux projected by the light projecting optical system. If the light flux projected by the light projecting optical system is sufficiently intensive at any part of the focus detection area within the distance range $l_r$, focus detection is made possible with respect to all parts of the focus detection area within the distance range $l_r$. FIGS. 50A, 50B and 50C schematically illustrate overlapping conditions of the light flux projected by the light projecting optical system and the focus detection area at the distances $L_{MIN}$, L and $L_{MAX}$, respectively. As is apparent from these figures, the focus detection area E overlaps an upper portion of the light flux at the distance $L_{MAX}$ while overlapping a lower portion of the light flux at the distanc $L_{MIN}$. The overlapping portion moves upward and downward with the change in the distance but does not move at all in the transverse direction even with the change in the distance. This indicates that, in order to widen the focus detection distance range, that is, the above described distance range $l_r$, it is necessary to widen the spread of the light flux in the vertical direction. Further, in widening the flux in the vertical direction, it is desirable to provide the widened flux with a rectangular cross-section being longer in the vertical direction than in the horizontal direction.

For example, in the case of B = 108 mm, $L_{MIN}$ = 0.6 m and $L_{MAX}$ = 7 m, the spread of the light flux must be ±4° in the vertical direction and ±1.5° in the horizontal direction if the spread of the focus detection area is ±0.2° in the vertical direction and ±1.3° in the horizontal direction.

On the other hand, the intensity of light emitted from a light source decreases in proportion to square of the distance from the light source. This indicates that the overlapping of the light flux with the focus detection area at the distanc $L_{MAX}$ cannot ensure accurate focus detection if the light flux is not sufficiently intensive within the focus detection area at the distance $L_{MAX}$. This will be of no problem if the light source has a large power. However, in the case a light source for lighting the focus detection area to help focus detection is incorporated in an electronic flash device which consumes much electric energy of a battery upon each flashing for flash photography, it cannot be allowed for the light source to consume so much electric energy of the battery. In view of such a restriction of consumption of electric energy, it is most desirable to provide the light flux projected by the light projecting optical system with intensity distribution as indicated by a curve I in FIG. 50c, so that at the distance $L_{MAX}$, the projected light flux has the highest intensity within the focus detection area.

In summary, it can be understood that the most efficient illumination of the focus detection area is provided by a light flux which has spread of a rectangular shape being longer in the vertical direction than in the horizontal direction and which has such intensity distribution that an upper portion thereof becomes most intensive.

Figure 52:
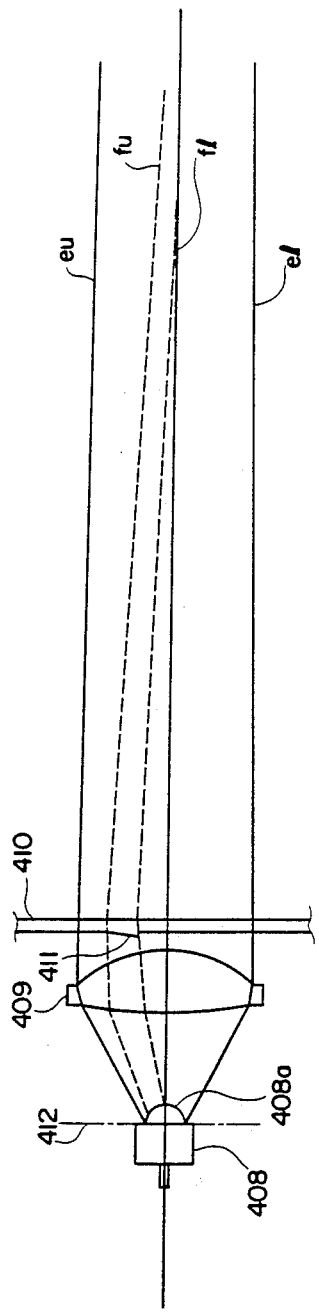
FIG. 52 is a side elevational view of a light projecting optical system of a lighting device according to a sixth embodiment of the present invention.

FIG. 52 shows a light projection optical system according to a sixth embodiment of the present invention.

In FIG. 52, a projection lens 409 is arranged in front of a light source device 408 and a protection transparent panel 410 integrally formed with a prism 411 at a part thereof is arranged in front of the projection lens 409. The light source 408 desirably has a structure in which a light emitting diode emitting a visible light of a long wavelength (for example, about 700 nm) is embedded in a unit member which is molded of a transparent resin and integrally formed with a spherical light condensing portion 408a at a region opposing to the projection lens 409. The position of the projection lens 409 in the direction of optical axis is determined so as to focus the spherical light condensing portion 408a, for example, at the distance of 5 m. The position indicated by virtual line 412 is the conjugate positon corresponding to the distance of 5 m. The light flux emitted from the light source device 408 is condensed by the portion 408a to be refracted by the projection lens 409 and then projected towards the object side through the parallel plate part of the protection panel 410. The range defined by the pencils of light $e_u$ and $e_l$ indicates the range of spread of the light flux in the vertical direction. A part of the light flux incident on the prism 411 after having passed through the projectin lens 409 is deflected downward by the effect of the prism and then projected toward the object side within the range of spread defined by the pencils of light $f_u$ and $f_l$. Since light intensity within the range of spread $f_u \sim f_l$ is determined by the area of the prism 411, appropriate setting of the area of the prism makes it possible to make the light flux having been deflected by the prism weaker than the light flux having passed through the parallel plate part of the protection panel 410.

Figure 53:
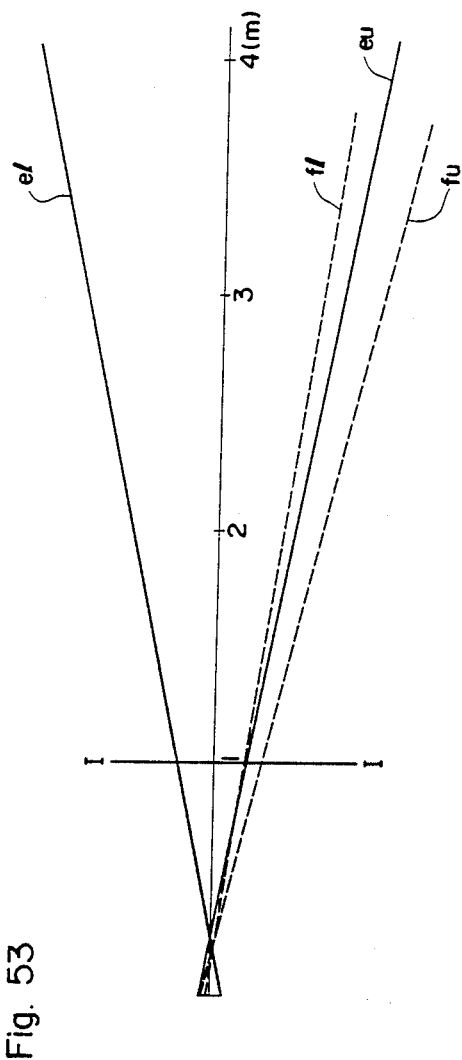
FIG. 53 is a side elevational view of the light flux projected by the light projecting optical system of FIG. 52.

FIG. 53 illustrates the path of the light flux projected by the light projecting optical system of FIG. 52. The pencils of light $e_u$, $e_l$, $f_u$ and $f_l$ correspond to those in FIG. 52, respectively. The pencil of light $f_l$ which has passed through the prism 411 to be deflected thereby and the pencil of light $e_u$ which has passed through the parallel plate part of the panel 410 cross each other at the distance of 1 m and then partially overlaps each other at distances longer than 1 m.

Figure 54:
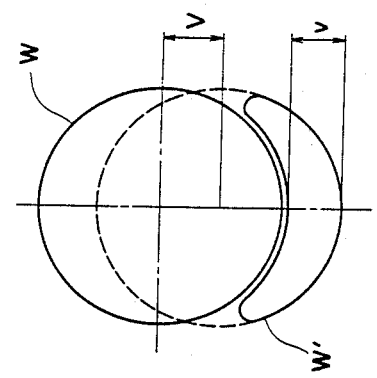
FIG. 54 is a cross-section of the light flux at I—I in FIG. 53.

FIG. 54 is a sectional view of light flux shown in FIG. 53 at the distance of 1 m. W indicates a light image by the light flux having passed through the parallel plate part of protection panel 410 and W indicates a light image by the light flux having being refracted by the prism 411. The center of the light image of the spherical portion 408a deflected by the prism 411 is formed at a position being lower by V than the light image W but only the crescent moon type region (the region indicated by the width v) is projected for the reason described below as shown in the figure.

Therefore, because of the use of prism 411 as light deflecting means, the illumination light has a spread where the light image W formed by the light flux, emitted from the entire part of spherical portion 408a and having passed through the parallel plate part of the protection panel 410 and the light image W' formed by the light flux emitted from a part of the spherical portion 408a and deflected by the prism 411 are partially overlapped with each other. Thus the spread of the illumination light is longer in the vertical direction than in the horizontal direction and the intensity distribution of the illumination light is such that the upper side of the illumination light which contributes to the lighting for far distance side is more intensive than the lower side of the illumination light which contributes to the lighting for near distance side.

Figure 55:
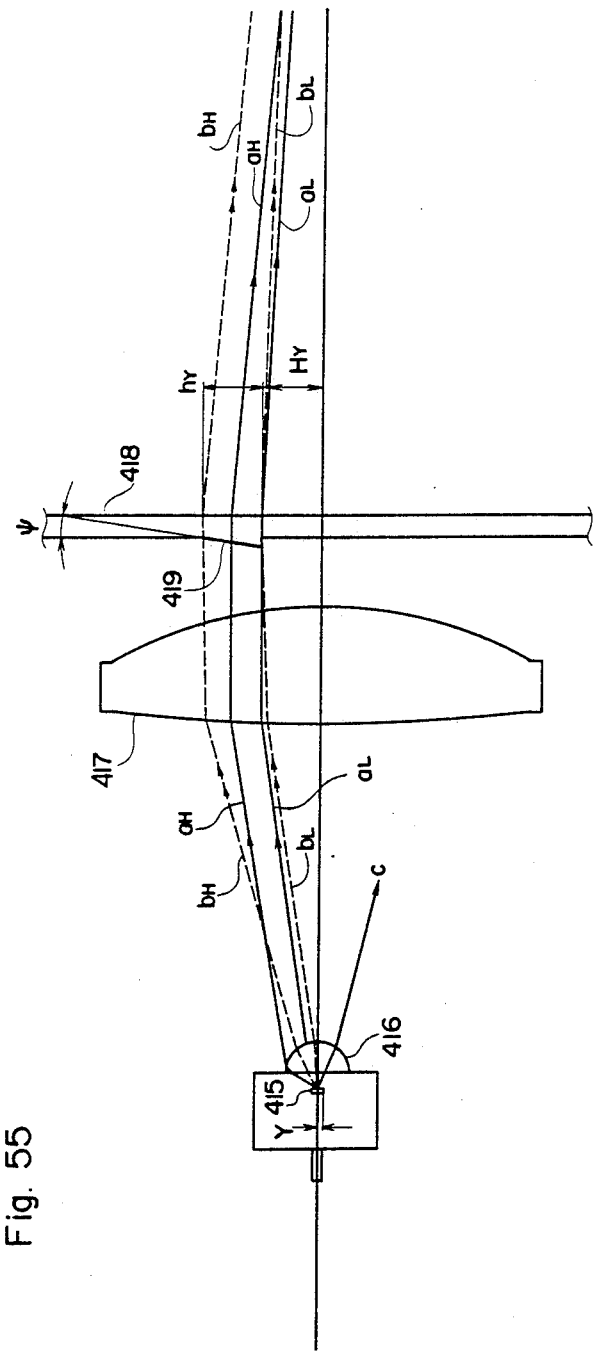
FIG. 55 is a side elevational view of the light projecting optical system same as that of FIG. 52, presented to explain how the light flux is deflected by the prism 419 in front of the projection lens 417.
Figure 56:
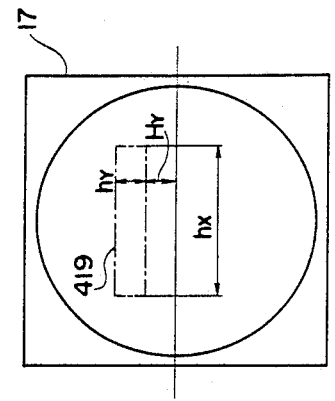
FIG. 56 is front view of the projection lens 417 showing the configuration of the prism 419 in front of the projection lens.

FIG. 55 is an optical path diagram for explaining the above phenomenon. The light exitted from a light emitting diode 415 is refracted by a spherical light condensing portion 416 toward a projection lens 417. Here, as shown in FIG. 56, a panel 418 is formed with a prism 419 having the lateral width $h_X$ and the vertical width $h_y$ at the distance of $H_Y$ from the optical axis of the lens 417. Regarding the lights emitted from a point of the light emitting diode 415 on the optical axis, the pencil of light $a_H$ passes through the highest part of the spherical surface of the portion 416 among the lights passing through the prism 419, while the pencil of light $a_L$ passes through the lowest part of the spherical surface among the lights passing through the prism 419. Regarding the lights emitted from a point of the light emitting diode 415 spaced from the optical axis by the distance Y, the pencils of light $b_H$ passes the highest part of spherical surface of the portion 416 among the lights passing through the prism 419, while the pencil of light $b_L$ passes through the lowest part of the spherical surface among the lights passing through the prism 419. As the size of the light emitting diode 415 is sufficiently smaller than the diameter of the portion 416 (the size of the chip of the diode 415 is actually about 0.5 mm in diameter at most) and the light emitting diode 415 is located rather near to the center of the spherical surface of the portion 415 (this location is determined in order for the projection lens 417 to receive maximum amount of light), the lights passing through the prism 419 are limited only to those lights which have passed through a part (almost upper half in the figure) of the portion 416. Like the pencil of light c, most of the lights having passed through the lower side of the portion 416 do not enter the prism 419. Therefore, a light image of the pattern 416 projected by the projection lens 417 through the prism 419 is in such a shape as indicated by W' in FIG. 54.

FIG. 56 illustrates a positional relationship between the projection lens 417 and the prism 419 viewed from the front. As shown the lateral width $h_x$ of the prism 419 is sufficiently longer than the vertical width $h_y$, so that an image of every part of the portion 416 of the width $h_X$ is projected by the projection lens 417 through the prism 419. This contributes to widen the width of the image W' as shown in FIG. 54.

In FIG. 57, the prism 419 shown in FIG. 55 is shifted in the vertical direction to come close to the optical axis ($H_Y=0$). As is similar to the case of FIG. 55, among the lights passing through the prism 419 after emanating from a point of the light emitting diode 415 located on the optical axis, the pencil of light $a_H$ passes through the highest part of the spherical surface of the portion 416 while the pencil of light $a_L$ passes through the lowest part of the spherical surface. The pencil of light $b_H$ passes through the highest part of the spherical surface of the portion 416 while the pencil of light $b_L$ passes through the lowest part of the spherical surface among the lights passing through the prism 419 after emanating from a point of the light emitting diode 415 spaced by the distance Y from the optical axis. It is seen that the area on the portion 416 where the lights directed to the prism 419 pass is a little lower than that in FIG. 55.

Figure 58C:
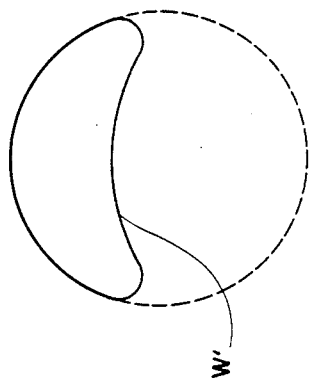
FIGS. 58A, 58B and 58C are cross-sections of the light flux deflected by the prism with the prism arranged at different positions relative to the projection optical axis.
Figure 58B:
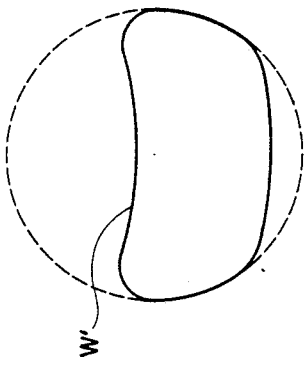
Figure 58A:
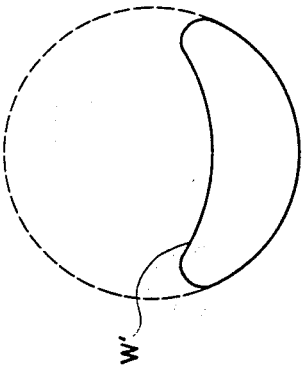

FIGS. 58A, 58B and 58C show relationship between the position of the prism 19 in the vertical direction relative to the optical axis and the image W' formed by the projection lens 417 through the prism 419, for example, at the section I—I in FIG. 53. The image W' moves from the position of FIG. 58A to the position of FIG. 58C as the positon of prism 419 given by the distance $H_Y$ is lowered. The condition of FIG. 58A corresponds to the case of FIG. 55 ($H_Y>0$), while the condition of FIG. 58B to the case of FIG. 57 ($H_Y=0$) and the condition of FIG. 58C to the case of $H_Y<0$.

Figure 59A:
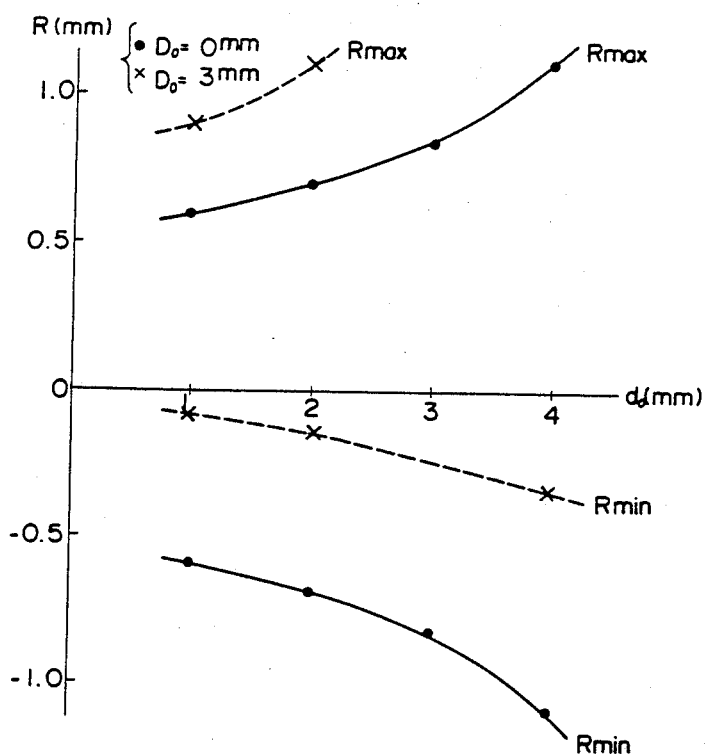
FIG. 59A is a graph illustrating change in the range $R_{min}$-$R_{max}$ of the light flux emitted to pass through the prism due to change in the width $d_0$ of the prism.
Figure 59B:
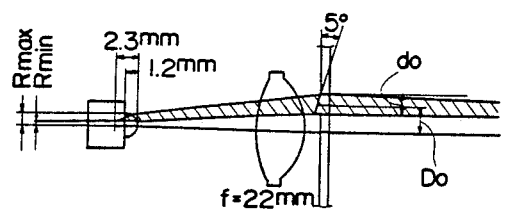
FIG. 59B is a side elevational view of the light projecting optical system same as that of FIG. 52, presented to define the various factors shown in FIG. 59A.

FIG. 59A shows how the effective region on the portion 419 where the lights directed to the prism 419 pass changes due to change in the center position Do and the width do of the prism 419 in the vertical direction, in the model case shown in FIG. 59B. The uppermost light and the lowermost light among the lights passing through the prism emanate from the spherical surface of the light condensing portion at positions spaced by $R_{max}$ and $R_{min}$ from the optical axis and the region defined between $R_{max}$ and $R_{min}$ is the effective region.

Figure 60A:
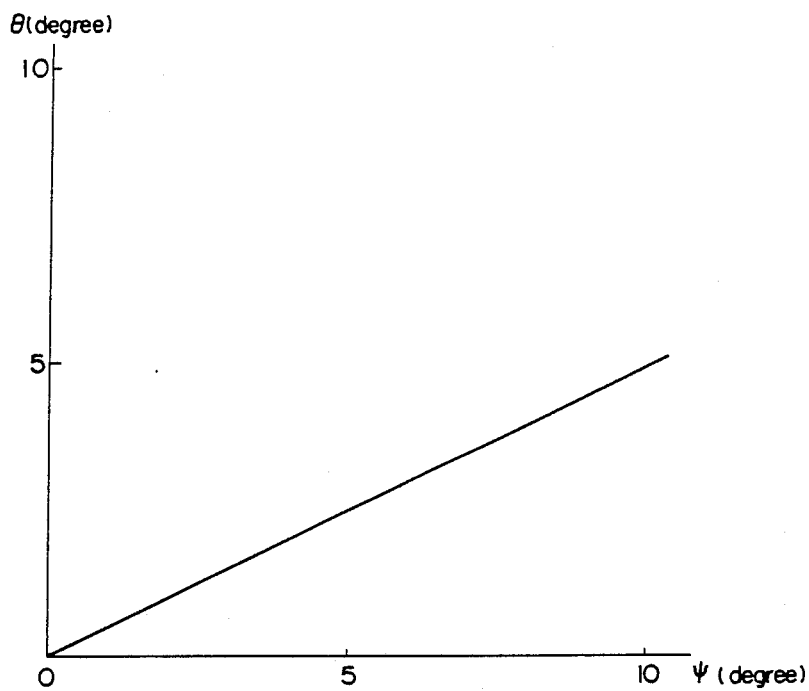
FIG. 60A is a graph illustrating change in the angle of deflection $\theta$ due to change in the vertex angle $\delta$ of the prism.
Figure 60B:
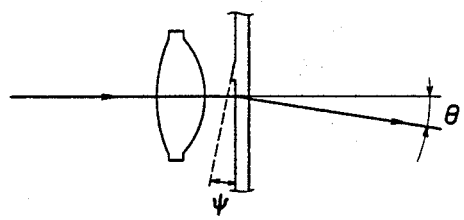
FIG. 60B is a diagram to define the angle of deflection $\theta$ and the vertex angle $\delta$ of the prism.

FIG. 60A shows relationship between the angle $\psi$ of the prism and the deflection and $\theta$ (see FIG. 60B). The angle $\psi$, the size and the location of the prism can be determined from the graphs of FIGS. 59A and 60A if it is determined where the light flux having passed the prism and the light flux having passed through the parallel plate part of the panel begin to overlap each other as explained above with reference to FIG. 53.

Figure 61:
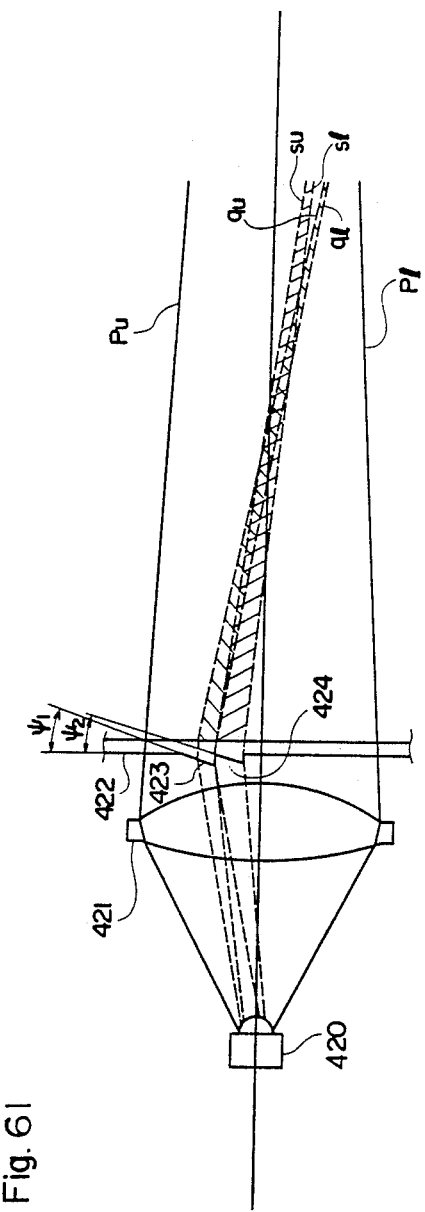
FIG. 61 is a side elevational view of a light projecting optical system of a lighting device according to a seventh embodiment of the present invention.

FIG. 61 shows a light projecting optical system of a lighting device according to a seventh embodiment of the present invention. In this figure, 420 and 421 represent light source device and a projection lens, respectively.

Figure 62:
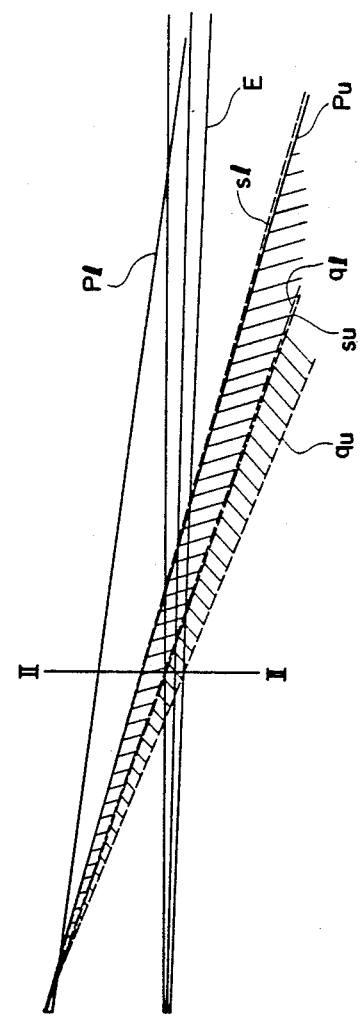
FIG. 62 is a side elevational view illustrating the positional relationship between the light flux projected by the light projecting optical system of FIG. 61 and the focus detection area.
Figure 63:
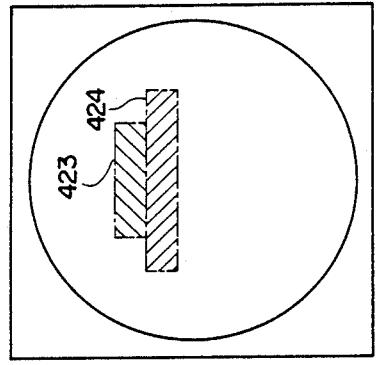
FIG. 63 is a front view of the projection lens 421 showing the configurations of the prism 423 and 424 in front of the projection lens.

A protection panel 422 is provided with a pair of prisms 423 and 424 having angles $\psi_1$ and $\psi_2$, respectively, as shown. The angle $\psi_1$ is larger than the angle $\psi_2$. FIG. 62 shows an optical path of the light flux projected by the light projecting optical system of FIG. 61. $P_u$ and $P_l$ indicate the range of spread of the light flux having passed through the parallel plate region of the panel 422, while $q_u$ and $q_l$ indicate the range of spread of the light flux deflected by the prism 423. Further, $s_u$ and $s_l$ indicate the range of spread of the light flux deflected by the prism 424. Since the angle $\psi_1$ the prism 423 is larger than the angle $\psi_2$ of the prism 424, the light flux having passed through the prism 423 is deflected to a larger extent for lighting a nearer distance side than the light flux having passed through the prism 424. The sizes of the prism 423 and 424 projected on the projection lens 421 are shown in FIG. 63. As shown, the area of the upper side prism 424 is larger than the area of the lower prism 424, so that the light flux having passed through the prism 424 is more intensive than the light flux having passed through the prism 423. This is advantageous because a farther distance range is illuminated by higher intensity light.

Figure 64:
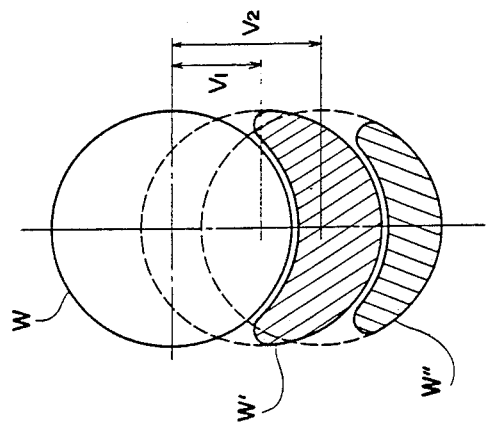
FIG. 64 is a cross section of the light flux at II—II in FIG. 62.

FIG. 64 indicates a cross-section of the light flux projected by the optical system of FIG. 62 at II—II of FIG. 63. W is an image of the front spherical portion of the light source device 420 formed by the light flux ($P_l \sim P_u$) having passed through the parallel plate part of protection panel 422, while W' and W'' are images of the same spherical portion formed by the light flux ($S_u \sim S_l$) and the light flux ($q_u \sim q_l$), respectively. The image W' has the shape corresponding, for example, to FIG. 58B, and the image W'' to FIG. 59A. From the point of view of image brightness, the image W is brightest and the image W' is brighter than the image W''.

Namely, the light projecting optical system of FIG. 61 can provide an illumination light flux which has a large spread in the vertical direction as a whole and has the sequential intensity distribution of high, intermediate and low intensities from the upper side.

Figure 65:
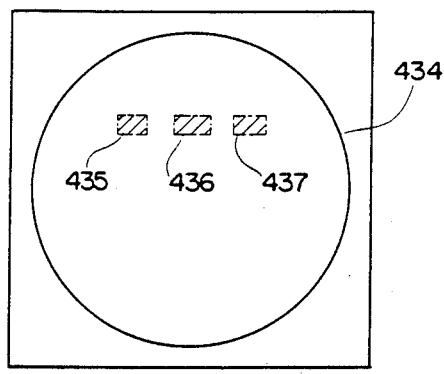
FIG. 65 is a front view of a projection lens 434 of a lighting device according to an eighth embodiment of the present invention, showning the configuration of prisms 435, 436 and 437 in front of the projection lens.

FIG. 65 shows essential parts of a lighting device according to an eighth embodiment of the present invention. In this embodiment, three small prisms 435, 436 and 437 having an equal vertex angle (corresponding to $\psi$ in FIGS. 55 and 57) are intermittently formed in the lateral direction on a protection panel arranged in front of a projection lens 434. If the lateral length of a single prism is shortened in order to weaken the light flux deflected thereby, the phenomenon shown in FIGS. 59A, 59B and 59C also occurs in the lateral direction, resulting in inconvenience for illumination. However, the intermittent arrangement of the prisms 435, 436 and 437 as shown in FIG. 65 not only weakens the light fluxes deflected by the prisms but also suppresses occurrence of such a phenomenon.

Figure 66:
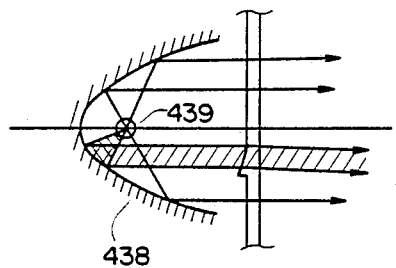
FIG. 66 is a side elevatioal view of a light projecting optical system of a lighting device according to a ninth embodiment of the present invention.

FIG. 66 shows essential parts of a lighting device according to a ninth embodiment, in which a reflector 438 is used in place of a projection lens and a discharge bulb 439 is used as a light source in place of a light emitting diode.

Figure 67:
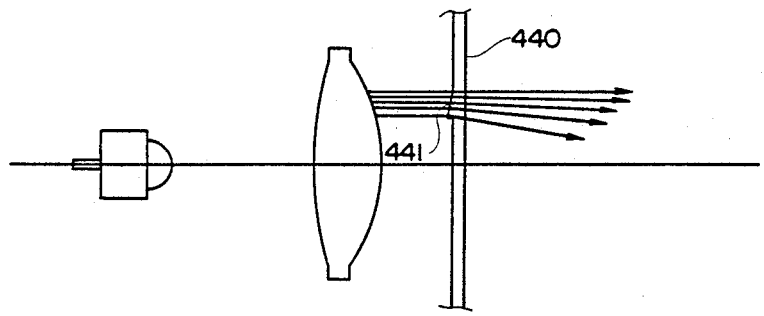
FIG. 67 is a side elevational view of a light projecting optical system according to a tenth embodiment of the present invention.

FIG. 67 shows a light projecting optical system of a lighting device according to a tenth embodiment, in which a cylindrical lens 41 is formed on a protection panel 440 in place of a prism. The cylindrical lens 41 diverges the light flux incident thereon in such a manner that a shorter distance side is illuminated by higher intensity light. It is also possible to use an aspherical lens in place of the cylindrical lens 441.

In the sixth to tenth embodiments, light deflection means such as a prism and a cylindrical lens is formed on a protection panel but it may be arranged at a desired position between a light source and a projecting lens, so long as it can give the spread and intensity distribution described above.

What is claimed is:
1. A focus detection system for detecting focus condition of an objective lens of a camera with respect to an object within a focus detection area which spreads at a solid angle centering at the optical axis of said objective lens, comprising:
- a light projecting optical system for projecting a flux of light which crosses said focus detection area at a predetermined angle;
- a light source for emitting light, said light source including:
- a light emitting diode adapted to emit said light from its front surface and its side surfaces;
- a transparent molded member disposed in front of said front surface of said light emitting diode and having a spherical surface;
- a concave light reflective member surrounding said side surfaces of said light emitting diode to reflect said light emitted from said side surfaces of said light emitting diode towards said transparent molded member;
- a projective pattern including a plurality of alternatively arranged transparent portions and opaque portions; and
- a projecting lens for projecting said light forward as said flux of light, wherein said light source fulfills the following conditions:

$$0.6 < l/R < 1.1$$

$$l = h - R$$

wherein: h represents a distance between the top of the spherical surface of the transparent molded member and the front face of the light emitting diode; and R represents a radius of curvature of the transparent molded member.

2. A focus detection system for detecting focus condition of an objective lens of a camera with respecft to an object within a focus detection area which spreads at a solid angle centering at the optical axis of said objective lens, comprising:
- a light projecting optical system for projecting a flux of light which crosses said focus detection area at a predetermined angle;
- a light source for emitting light, said light source including:
- a light emitting diode adapted to emit said light from its front surface and its side surfaces;
- a transparent molded member disposed in front of said front surface of said light emitting diode and having a spherical surface;
- a concave light reflective member surrounding said side surfaces of said light emitting diode to reflect said light emitted from said side surfaces of said light emitting diode towards said transparent molded member;
- a projective pattern including a plurality of alternatively arranged transparent portions and opaque portions; and
- a projecting lens for projecting said light forward as said flus of light, wherein said light source fulfills the following conditions:

$$0.8 < l/R < 1.3$$

$$l = h - R$$

wherein: h represents a distance between the top of the spherical surface of the transparent molded member and the front face of the light emitting diode; and R represents a radius of curvature of the transparent molded member.

3. An accessory for use with a camera having a focus detection system for detecting focus condition of an objective lens of said camera with respect to an object within a focus detection area which spreads at a solid angle centering at the optical axis of said objective lens, said accessory comprising:
- a light projecting optical system for projecting a flux of light which crosses said focus detection area at a predetermined angle;
- a light source for emitting light, said light source including:
- a light emitting diode adapted to emit said light from its front surface and its side surfaces;
- a transparent molded member disposed in front of said front surface of said light emitting diode and having a spherical surface;
- a concave light reflective member surrounding said side surfaces of said light emitting diode to reflect sad from said side surfaces of said light emitting diode towards said transparent molded member;
- a projective pattern including a plurality of alternatively arranged transparent portions and opaque oprtions; and
- a projecting lens for projecting said light forward as said flux of light, wherein said light source fulfills the following conditions:

$$0.6 < l/R < p1.1$$

$$l = h - R$$

wherein: h represents a distance between the top of the spherical surface of the transparent molded member and the front face of the light emitting diode; and R represents a radius of curvature of the transparent molded member.

4. An accessory for use with a camera having a focus detection system for detecting focus condition of an objective lens of said camera with respect to an object within a focus detection area which spreads at a solid angle centering at the optical axis of said objective lens, said accessory comprising:
- a light projecting optical system for projecting a flux of light which crosses said focus detection area at a predetermined angle;
- a light source for emitting light, said light source including:
- a light emitting diode adapted to emit said light from its front surface and its side surfaces;
- a transparent molded member disposed in front of said front surface of said light emitting diode and having a spherical surface;
- a concave light reflective member surrounding said side surfaces of said light emitting diode to reflect said light emitted from said side surfaces of said light emitting diode towards said transparent molded member;
- a projective pattern including a plurality of alternatively arranged transparent portions and opaque portions; and
- a projecting lens for projecting said light forward as said flux of light, wherein said light source fulfills the following conditions:

$$0.8 < l/R < 1.3$$

$$l = h - R$$

wherein: h represents a distance between the top of the spherical surface of the transparent molded member and the front face of the light emitting diode; and R represents a radius of curvature of the transparent molded member.

* * * * *